(12) United States Patent
Banks

(10) Patent No.: US 7,383,503 B2
(45) Date of Patent: *Jun. 3, 2008

(54) FILTERING A COLLECTION OF ITEMS

(75) Inventor: Richard Banks, Egham (GB)

(73) Assignee: Microsoft Corporation, Redmond, WA (US)

(*) Notice: Subject to any disclaimer, the term of this patent is extended or adjusted under 35 U.S.C. 154(b) by 527 days.

This patent is subject to a terminal disclaimer.

(21) Appl. No.: 11/063,885

(22) Filed: Feb. 23, 2005

(65) Prior Publication Data

US 2006/0190817 A1 Aug. 24, 2006

(51) Int. Cl.
G06F 17/21 (2006.01)
G06F 3/048 (2006.01)
G06F 17/30 (2006.01)

(52) U.S. Cl. .................. 715/273; 715/243; 715/810; 715/825; 707/3; 707/7

(58) Field of Classification Search ........ 715/517–520, 715/526, 539, 764, 810, 243–246, 273, 825; 707/1–3, 102, 7

See application file for complete search history.

(56) References Cited

U.S. PATENT DOCUMENTS

| | | |
|---|---|---|
| 5,241,671 A | 8/1993 | Reed et al. |
| 5,333,315 A | 7/1994 | Saether et al. |
| 5,388,196 A | 2/1995 | Pajak et al. |
| 5,461,710 A | 10/1995 | Bloomfield et al. |
| 5,485,197 A * | 1/1996 | Hoarty ............... 725/37 |
| 5,499,364 A | 3/1996 | Klein et al. |
| 5,504,852 A | 4/1996 | Thompson-Rohrlich |
| 5,513,306 A | 4/1996 | Mills et al. |
| 5,559,948 A | 9/1996 | Bloomfield et al. |
| 5,598,524 A | 1/1997 | Johnston, Jr. et al. |
| 5,630,042 A | 5/1997 | McIntosh et al. |
| 5,680,563 A | 10/1997 | Edelman |
| 5,696,486 A | 12/1997 | Poliquin et al. |
| 5,757,925 A | 5/1998 | Faybishenko |
| 5,790,121 A | 8/1998 | Sklar et al. |

(Continued)

FOREIGN PATENT DOCUMENTS

CN 1421800 11/2001

(Continued)

OTHER PUBLICATIONS

Lee, J., "An End-User Perspective on File-Sharing Systems," Communications of the ACM 46(2):48-53, Feb. 2003.
Ohtani, A., et al., "A File Sharing Method For Storing Area Network and Its Performance Verification," NEC Res. & Develop. 44(1):85-90, Jan. 2003.

(Continued)

Primary Examiner—Stephen Hong
Assistant Examiner—Adam L Basehoar
(74) Attorney, Agent, or Firm—Banner & Witcoff, Ltd.

(57) ABSTRACT

A user interface is provided wherein a set of items is displayed as a set of item representations (such as icons or thumbnails), and wherein a filtered subset of those items are visually identified in accordance with a user-defined criterion. All of the item representations are displayed on the screen in some form, regardless of which of the items have been filtered out. Further, the item representations may be displayed in various formats such as collected together in arrays or carousels as appropriate. This may allow the user interface to visually distinguish between those items that have been filtered out and those that are considered relevant.

17 Claims, 11 Drawing Sheets

U.S. PATENT DOCUMENTS

| | | |
|---|---|---|
| 5,802,516 A | 9/1998 | Shwarts et al. |
| 5,831,606 A | 11/1998 | Nakajima et al. |
| 5,835,094 A | 11/1998 | Ermel et al. |
| 5,838,317 A | 11/1998 | Bolnick et al. |
| 5,838,322 A | 11/1998 | Nakajima et al. |
| 5,867,163 A | 2/1999 | Kurtenbach |
| 5,875,446 A | 2/1999 | Brown et al. |
| 5,878,410 A | 3/1999 | Zbikowski et al. |
| 5,899,995 A | 5/1999 | Millier et al. |
| 5,923,328 A | 7/1999 | Griesmer |
| 5,929,854 A | 7/1999 | Ross |
| 5,933,139 A | 8/1999 | Feigner et al. |
| 5,935,210 A | 8/1999 | Stark |
| 5,982,369 A * | 11/1999 | Sciammarella et al. ..... 715/835 |
| 5,987,454 A | 11/1999 | Hobbs |
| 5,987,506 A | 11/1999 | Carter et al. |
| 6,003,040 A | 12/1999 | Mital et al. |
| 6,008,806 A | 12/1999 | Nakajima et al. |
| 6,014,137 A | 1/2000 | Burns |
| 6,021,262 A | 2/2000 | Cote et al. |
| 6,023,708 A | 2/2000 | Mendez et al. |
| 6,025,843 A | 2/2000 | Sklar |
| 6,037,944 A | 3/2000 | Hugh |
| 6,043,817 A * | 3/2000 | Bolnick et al. ............. 715/788 |
| 6,061,692 A | 5/2000 | Thomas et al. |
| 6,061,695 A | 5/2000 | Slivka et al. |
| 6,078,924 A | 6/2000 | Ainsbury et al. |
| 6,097,389 A | 8/2000 | Morris et al. |
| 6,144,968 A | 11/2000 | Zellweger |
| 6,147,601 A | 11/2000 | Sandelman et al. |
| 6,181,342 B1 | 1/2001 | Niblack |
| 6,202,061 B1 | 3/2001 | Khosla et al. |
| 6,237,011 B1 | 5/2001 | Ferguson et al. |
| 6,240,421 B1 | 5/2001 | Stolarz |
| 6,243,094 B1 | 6/2001 | Sklar |
| 6,243,724 B1 | 6/2001 | Mander et al. |
| 6,246,411 B1 | 6/2001 | Strauss |
| 6,256,031 B1 | 7/2001 | Meijer et al. |
| 6,275,829 B1 | 8/2001 | Angiulo et al. |
| 6,308,173 B1 | 10/2001 | Glasser et al. |
| 6,317,142 B1 | 11/2001 | Decoste et al. |
| 6,324,551 B1 | 11/2001 | Lamping et al. |
| 6,339,767 B1 | 1/2002 | Rivette et al. |
| 6,341,280 B1 | 1/2002 | Glass et al. |
| 6,363,377 B1 | 3/2002 | Kravets et al. |
| 6,363,400 B1 | 3/2002 | Chtchetkine et al. |
| 6,401,097 B1 | 6/2002 | McCotter et al. |
| 6,411,311 B1 | 6/2002 | Rich et al. |
| 6,430,575 B1 | 8/2002 | Dourish et al. |
| 6,437,807 B1 | 8/2002 | Berquist et al. |
| 6,448,985 B1 | 9/2002 | McNally |
| 6,453,311 B1 | 9/2002 | Powers, III |
| 6,453,319 B1 | 9/2002 | Mattis et al. |
| 6,466,238 B1 | 10/2002 | Berry et al. |
| 6,466,932 B1 | 10/2002 | Dennis et al. |
| 6,480,835 B1 | 11/2002 | Light |
| 6,505,233 B1 | 1/2003 | Hanson et al. |
| 6,513,038 B1 | 1/2003 | Hasegawa et al. |
| 6,526,399 B1 | 2/2003 | Coulson et al. |
| 6,535,229 B1 | 3/2003 | Kraft |
| 6,535,230 B1 | 3/2003 | Celik |
| 6,539,399 B1 | 3/2003 | Hazama et al. |
| 6,549,217 B1 | 4/2003 | De Greef et al. |
| 6,549,916 B1 | 4/2003 | Sedlar |
| 6,563,514 B1 | 5/2003 | Samar |
| 6,573,906 B1 | 6/2003 | Harding et al. |
| 6,573,907 B1 | 6/2003 | Madrane |
| 6,583,799 B1 | 6/2003 | Manolis et al. |
| 6,590,585 B1 | 7/2003 | Suzuki et al. |
| 6,606,105 B1 | 8/2003 | Quartetti |
| 6,613,101 B2 | 9/2003 | Mander et al. |
| 6,628,309 B1 | 9/2003 | Dodson et al. |
| 6,636,238 B1 | 10/2003 | Amir et al. |
| 6,636,250 B1 | 10/2003 | Gasser |
| 6,662,198 B2 | 12/2003 | Satyanarayanan et al. |
| 6,684,222 B1 | 1/2004 | Cornelius et al. |
| 6,735,623 B1 | 5/2004 | Prust |
| 6,738,770 B2 | 5/2004 | Gorman |
| 6,745,206 B2 | 6/2004 | Mandler et al. |
| 6,754,829 B1 | 6/2004 | Butt et al. |
| 6,762,776 B2 | 7/2004 | Huapaya |
| 6,762,777 B2 | 7/2004 | Carroll |
| 6,763,458 B1 | 7/2004 | Watanabe et al. |
| 6,768,999 B2 | 7/2004 | Prager et al. |
| 6,784,900 B1 | 8/2004 | Dobronsky et al. |
| 6,795,094 B1 | 9/2004 | Watanabe et al. |
| 6,801,919 B2 | 10/2004 | Hunt et al. |
| 6,803,926 B1 | 10/2004 | Lamb et al. |
| 6,816,863 B2 | 11/2004 | Bates et al. |
| 6,823,344 B1 | 11/2004 | Isensee et al. |
| 6,839,702 B1 * | 1/2005 | Patel et al. .................... 707/3 |
| 6,847,959 B1 | 1/2005 | Arrouye et al. |
| 6,853,391 B2 | 2/2005 | Bates et al. |
| 6,865,568 B2 | 3/2005 | Chau |
| 6,871,348 B1 | 3/2005 | Cooper |
| 6,876,996 B2 | 4/2005 | Czajkowski et al. |
| 6,880,132 B2 | 4/2005 | Uemura |
| 6,883,009 B2 | 4/2005 | Yoo |
| 6,883,146 B2 | 4/2005 | Prabhu et al. |
| 6,906,722 B2 | 6/2005 | Hrebejk et al. |
| 6,922,709 B2 | 7/2005 | Goodman |
| 6,938,207 B1 | 8/2005 | Haynes |
| 6,944,647 B2 | 9/2005 | Shah et al. |
| 6,947,959 B1 | 9/2005 | Gill |
| 6,950,818 B2 | 9/2005 | Dennis et al. |
| 6,952,724 B2 | 10/2005 | Prust |
| 6,980,993 B2 | 12/2005 | Horvitz et al. |
| 7,010,755 B2 | 3/2006 | Anderson et al. |
| 7,051,291 B2 | 5/2006 | Sciammarella et al. |
| 7,068,291 B1 | 6/2006 | Roberts et al. |
| 7,091,998 B2 * | 8/2006 | Miller-Smith ............... 715/810 |
| 7,139,811 B2 | 11/2006 | Lev Ran et al. |
| 7,139,982 B2 * | 11/2006 | Card et al. .................. 715/786 |
| 7,146,573 B2 * | 12/2006 | Brown et al. ............... 715/802 |
| 7,203,948 B2 | 4/2007 | Mukundan et al. |
| 2001/0034771 A1 | 10/2001 | Hutsch et al. |
| 2001/0047368 A1 | 11/2001 | Oshinsky et al. |
| 2001/0049675 A1 | 12/2001 | Mandler et al. |
| 2001/0053996 A1 | 12/2001 | Atkinson |
| 2001/0056434 A1 | 12/2001 | Kaplan et al. |
| 2001/0056508 A1 | 12/2001 | Arneson et al. |
| 2002/0019935 A1 | 2/2002 | Andrew et al. |
| 2002/0033844 A1 | 3/2002 | Levy et al. |
| 2002/0046232 A1 | 4/2002 | Adams et al. |
| 2002/0046299 A1 | 4/2002 | Lefeber et al. |
| 2002/0049717 A1 | 4/2002 | Routtenberg et al. |
| 2002/0052885 A1 | 5/2002 | Levy |
| 2002/0054117 A1 * | 5/2002 | van Dantzich et al. ..... 345/766 |
| 2002/0054167 A1 | 5/2002 | Hugh |
| 2002/0059199 A1 | 5/2002 | Harvey |
| 2002/0062310 A1 | 5/2002 | Marmor et al. |
| 2002/0075310 A1 | 6/2002 | Prabhu et al. |
| 2002/0075312 A1 | 6/2002 | Amadio et al. |
| 2002/0075330 A1 | 6/2002 | Rosenzweig et al. |
| 2002/0087740 A1 | 7/2002 | Castanho et al. |
| 2002/0087969 A1 | 7/2002 | Brunheroto et al. |
| 2002/0089540 A1 | 7/2002 | Geier et al. |
| 2002/0091679 A1 | 7/2002 | Wright |
| 2002/0091697 A1 | 7/2002 | Huang et al. |
| 2002/0091739 A1 | 7/2002 | Ferlitsch et al. |
| 2002/0095416 A1 | 7/2002 | Schwols |
| 2002/0097278 A1 | 7/2002 | Mandler et al. |
| 2002/0103998 A1 | 8/2002 | DeBruine |
| 2002/0104069 A1 | 8/2002 | Gouge et al. |

| | | | | | | |
|---|---|---|---|---|---|---|
| 2002/0107973 A1 | 8/2002 | Lennon et al. | | 2004/0070612 A1 | 4/2004 | Sinclair et al. |
| 2002/0111942 A1 | 8/2002 | Campbell et al. | | 2004/0083433 A1 | 4/2004 | Takeya |
| 2002/0113821 A1 | 8/2002 | Hrebejk et al. | | 2004/0085581 A1 | 5/2004 | Tonkin |
| 2002/0120505 A1 | 8/2002 | Henkin et al. | | 2004/0088374 A1 | 5/2004 | Webb et al. |
| 2002/0120757 A1 | 8/2002 | Sutherland et al. | | 2004/0091175 A1 | 5/2004 | Beyrouti |
| 2002/0129033 A1 | 9/2002 | Hoxie et al. | | 2004/0098370 A1 | 5/2004 | Garland et al. |
| 2002/0138552 A1 | 9/2002 | DeBruine et al. | | 2004/0098379 A1 | 5/2004 | Huang |
| 2002/0138582 A1 | 9/2002 | Chandra et al. | | 2004/0098742 A1 | 5/2004 | Hsieh et al. |
| 2002/0138744 A1 | 9/2002 | Schleicher et al | | 2004/0103280 A1 | 5/2004 | Balfanz et al. |
| 2002/0152262 A1 | 10/2002 | Arkin et al. | | 2004/0117358 A1 | 6/2004 | Von Kaenel et al. |
| 2002/0152267 A1 | 10/2002 | Lennon | | 2004/0133572 A1 | 7/2004 | Bailey et al. |
| 2002/0156895 A1 | 10/2002 | Brown | | 2004/0133588 A1 | 7/2004 | Kiessig et al. |
| 2002/0161800 A1 | 10/2002 | Eld et al. | | 2004/0148434 A1 | 7/2004 | Matsubara et al. |
| 2002/0163572 A1 | 11/2002 | Center et al. | | 2004/0153451 A1 | 8/2004 | Phillips et al. |
| 2002/0169678 A1 | 11/2002 | Chao et al. | | 2004/0153968 A1 | 8/2004 | Ching et al. |
| 2002/0184357 A1 | 12/2002 | Traversat et al. | | 2004/0167942 A1 | 8/2004 | Oshinsky et al. |
| 2002/0188605 A1 | 12/2002 | Adya et al. | | 2004/0177116 A1 | 9/2004 | McConn et al. |
| 2002/0188735 A1 | 12/2002 | Needham et al. | | 2004/0177148 A1 | 9/2004 | Tsimelzon, Jr. |
| 2002/0194252 A1 | 12/2002 | Powers, III | | 2004/0177319 A1 | 9/2004 | Horn |
| 2002/0196276 A1 | 12/2002 | Corl et al. | | 2004/0183824 A1 | 9/2004 | Benson et al. |
| 2002/0199061 A1 | 12/2002 | Friedman et al. | | 2004/0189704 A1 | 9/2004 | Walsh et al. |
| 2003/0009484 A1 | 1/2003 | Hamanaka et al. | | 2004/0189707 A1 | 9/2004 | Moore et al. |
| 2003/0014415 A1 | 1/2003 | Weiss et al. | | 2004/0193594 A1 | 9/2004 | Moore et al. |
| 2003/0018657 A1 | 1/2003 | Monday | | 2004/0193600 A1 | 9/2004 | Kaasten et al. |
| 2003/0018712 A1 | 1/2003 | Harrow et al. | | 2004/0193621 A1 | 9/2004 | Moore et al. |
| 2003/0028610 A1 | 2/2003 | Pearson | | 2004/0193672 A1 | 9/2004 | Samji et al. |
| 2003/0041178 A1 | 2/2003 | Brouk et al. | | 2004/0193673 A1 | 9/2004 | Samji et al. |
| 2003/0046260 A1 | 3/2003 | Satyanarayanan et al. | | 2004/0199507 A1 | 10/2004 | Tawa |
| 2003/0069893 A1 | 4/2003 | Kanai et al. | | 2004/0205168 A1 | 10/2004 | Asher |
| 2003/0069908 A1 | 4/2003 | Anthony et al. | | 2004/0205625 A1 | 10/2004 | Banatwala et al. |
| 2003/0074356 A1 | 4/2003 | Kaier et al. | | 2004/0205633 A1 | 10/2004 | Martinez et al. |
| 2003/0078918 A1 | 4/2003 | Souvignier et al. | | 2004/0205698 A1 | 10/2004 | Schliesmann et al. |
| 2003/0093321 A1 | 5/2003 | Bodmer et al. | | 2004/0215600 A1 | 10/2004 | Aridor et al. |
| 2003/0093531 A1 | 5/2003 | Yeung et al. | | 2004/0220899 A1 | 11/2004 | Barney et al. |
| 2003/0093580 A1 | 5/2003 | Thomas et al. | | 2004/0223057 A1 | 11/2004 | Oura et al. |
| 2003/0101200 A1 | 5/2003 | Koyama et al. | | 2004/0225650 A1 | 11/2004 | Cooper et al. |
| 2003/0105745 A1 | 6/2003 | Davidson et al. | | 2004/0230572 A1 | 11/2004 | Omoigui |
| 2003/0110188 A1 | 6/2003 | Howard et al. | | 2004/0230599 A1 | 11/2004 | Moore et al. |
| 2003/0115218 A1 | 6/2003 | Bobbitt et al. | | 2004/0230917 A1 | 11/2004 | Bales et al. |
| 2003/0117403 A1 | 6/2003 | Park et al. | | 2004/0249902 A1 | 12/2004 | Tadayon et al. |
| 2003/0117422 A1 | 6/2003 | Hiyama et al. | | 2005/0004928 A1 | 1/2005 | Hamer et al. |
| 2003/0120928 A1 | 6/2003 | Cato et al. | | 2005/0010860 A1 | 1/2005 | Weiss et al. |
| 2003/0120952 A1 | 6/2003 | Tarbotton et al. | | 2005/0015405 A1 | 1/2005 | Plastina et al. |
| 2003/0122873 A1 | 7/2003 | Dieberger et al. | | 2005/0027757 A1 | 2/2005 | Kiessig et al. |
| 2003/0126136 A1 | 7/2003 | Omoigui | | 2005/0050470 A1 | 3/2005 | Hudson et al. |
| 2003/0126212 A1 | 7/2003 | Morris et al. | | 2005/0055306 A1 | 3/2005 | Miller et al. |
| 2003/0135495 A1 | 7/2003 | Vagnozzi | | 2005/0080807 A1 | 4/2005 | Beilinson et al. |
| 2003/0135517 A1 | 7/2003 | Kauffman | | 2005/0097477 A1 | 5/2005 | Camara et al. |
| 2003/0135659 A1 | 7/2003 | Bellotti et al. | | 2005/0114672 A1 | 5/2005 | Duncan et al. |
| 2003/0140115 A1 | 7/2003 | Mehra | | 2005/0120242 A1 | 6/2005 | Mayer et al. |
| 2003/0154185 A1 | 8/2003 | Suzuki et al. | | 2005/0131903 A1 | 6/2005 | Margolus et al. |
| 2003/0158855 A1 | 8/2003 | Farnham et al. | | 2005/0149481 A1 | 7/2005 | Hesselink et al. |
| 2003/0177422 A1 | 9/2003 | Tararoukhine et al. | | 2005/0166159 A1 | 7/2005 | Mondry et al. |
| 2003/0184587 A1 | 10/2003 | Ording et al. | | 2005/0171947 A1 | 8/2005 | Gautestad |
| 2003/0210281 A1 | 11/2003 | Ellis et al. | | 2005/0192953 A1 | 9/2005 | Neale et al. |
| 2003/0212680 A1 | 11/2003 | Bates et al. | | 2005/0192966 A1 | 9/2005 | Hilbert et al. |
| 2003/0212710 A1 | 11/2003 | Guy | | 2005/0243993 A1 | 11/2005 | McKinzie et al. |
| 2003/0222915 A1 | 12/2003 | Marion et al. | | 2005/0246331 A1 | 11/2005 | De Vorchik et al. |
| 2003/0225796 A1 | 12/2003 | Matsubara | | 2005/0246643 A1 | 11/2005 | Gusmorino et al. |
| 2003/0227487 A1 | 12/2003 | Hugh | | 2005/0246664 A1 | 11/2005 | Michelman et al. |
| 2003/0233419 A1 | 12/2003 | Beringer | | 2005/0256909 A1 | 11/2005 | Aboulhosn et al. |
| 2004/0001106 A1 | 1/2004 | Deutscher et al. | | 2005/0257169 A1 | 11/2005 | Tu |
| 2004/0002993 A1 | 1/2004 | Toussaint et al. | | 2005/0283476 A1 | 12/2005 | Kaasten et al. |
| 2004/0003247 A1 | 1/2004 | Fraser et al. | | 2006/0004692 A1 | 1/2006 | Kaasten et al. |
| 2004/0008226 A1 | 1/2004 | Manolis et al. | | 2006/0020586 A1 | 1/2006 | Prompt et al. |
| 2004/0019584 A1 | 1/2004 | Greening et al. | | 2006/0036568 A1 | 2/2006 | Moore et al. |
| 2004/0019655 A1 | 1/2004 | Uemura et al. | | 2006/0048076 A1* | 3/2006 | Vronay et al. ............ 715/850 |
| 2004/0030731 A1 | 2/2004 | Iftode et al. | | 2006/0080308 A1 | 4/2006 | Carpentier et al. |
| 2004/0044696 A1 | 3/2004 | Frost | | 2006/0129627 A1 | 6/2006 | Phillips et al. |
| 2004/0044776 A1 | 3/2004 | Larkin | | 2006/0173873 A1 | 8/2006 | Prompt et al. |
| 2004/0054674 A1 | 3/2004 | Carpenter et al. | | 2006/0200466 A1 | 9/2006 | Kaasten et al. |
| 2004/0056896 A1 | 3/2004 | Doblmayr et al. | | | | |
| 2004/0068524 A1 | 4/2004 | Aboulhosn et al. | | | | |

| | | |
|---|---|---|
| 2006/0200832 A1 | 9/2006 | Dutton |
| 2006/0218122 A1 | 9/2006 | Poston et al. |

FOREIGN PATENT DOCUMENTS

| | | |
|---|---|---|
| GB | 2329492 | 3/1999 |
| WO | 9938092 | 7/1999 |
| WO | 01/63919 A1 | 8/2001 |
| WO | WO 0225420 | 3/2002 |
| WO | WO 2004107151 | 9/2004 |

OTHER PUBLICATIONS

H. Weinreich, et al., "The Look of the Link—Concepts of the User Interface of Extended Hyperlinks," Proceedings of the Twelfth ACM Conference on Hypertext and Hypermedia, Hypertext '01, Aarhus, Denmark, Aug. 2001, pp. 19-28.
Seltzer, M., et al., "Journaling Versus Soft Updates: Asynchronous Meta-data Protection in File Systems," Proceedings of the 2000 USENIX Technical Conference, San Diego, CA, Jun. 18-23, 2000, pp. 71-84.
R. Rao, et al., "Rich Interaction in the Digital Library," Communications of the ACM 38(4):29-39. 1995.
Piernas, J., et al., "DuallFS: A New Journaling File System Without Meta-Data Duplication," Conference Proceedings of the 2002 International Conference on Supercomputing, New York, Jun. 22-26, 2002, p. 137-146.
Manber, U., and S. Wu, "Glimpse: A Tool to Search Through Entire File Systems," Proceedings of USENIX Winter 1994 Conference, San Francisco, Ca, Jan. 17-21, 1994.
Coster, R., and D. Svensson, "Inverted File Search Algorithms for Collaborative Filtering," Proceedings of the 25th Annual International ACM SIGIR Conference on Research and Development in Information Retrieval, Tampere, Finland, Aug. 11-15, 2002
Gifford, D.K., et al., "Semantic File Systems," Proceedings of the 13th ACM Symposium on Operating Systems Principles, Pacific Grove CA., Sep. 1991, pp. 16-25.
Blair, C., and G.E. Monahan, "Optimal Sequential File Search: A Reduced-State Dynamic Programming Approach," European Jouranl of Operational Research 86(2):358-365, 1995.
Clay, L.M., et al., Posting Protocol for Improved Keyword Search Success in Peer-to-Peer File Sharing Systems, Proceedings of SPIE-Int. Soc. Opt. Eng., Santa Clara, CA Jan. 23-24, 2003, vol. 5019, pp. 138-149.
Na, J., and V. Rajaeavivarma, "Multimedia File Sharing in Multimedia Home or Office Business Networks," Proceedings of the 35th Southeastern Symposium on System Theory, Morgantown, W. Va., Mar. 16-18, 2003, pp. 237-241.
Kwon G., and K.D. Ryu, "An Efficient Peer-to-Peer File Sharing Exploring Hierarchy and Asymmetry," Proceedings of the 2003 Symposium on Applications and the Internet, Orlando, Fla., Jan. 27-31, 2003, pp. 226-233.
Qian, J., et al., "ACLA: A Framework for Access Control List (ACL) Analysis and Optimization," Fifth Joint Working Conference on Communications and Multimedia Security, Darnstadt, Germany, May 21-22, 2001, pp. 197-211.
Rao, J.R., "Some Performance Measures of File Sharing on Multiple Computer Systems," Proceedings of the Conference on Modeling and Simulation, vol. 6, Part I, Pittsburgh, Penn., Apr. 24-25, 1976, pp. 527-530.
Reinauer, R., "UNIX System V.# Remote File Sharing Capabilities and Adminstration," Unisphere 8(6):64-68, Sep. 1998.
Templin, P.J., Jr., "Providing a Centralized File Sharing Resource at Bucknell University", Proceedings of the User Services Conference for College and University Computing Services Organization, Bloomington, Ind., Oct. 25-28, 1998, pp. 289-292.
Yamai, N. et al., "NFS-Based Secure File Sharing Over Multiple Administrative Domains With Minimal Administration," Systems and Computers in Japan 33(14):50-58, Dec. 2002.
Yong Kyu Lee, et al., Metadata Management of the SANtopia File System, Proceedomgs of the 8th International Conference onParallel and Distributed Systems (ICPADS 2001), Koyoungju City, Korea, Jun. 26-29, 2001, pp. 492-499, IEEE Computer Society, 2001, ISBN 0-7695-1153-8.
Horst F. Wedde, et al., A Universal Framework for Managing Metadata in the Distributed Dragon Slayer System, Proceedings of the 26th EUROMICRO Conference (EUROMICRO'00), vol. 2, Maastricht, The Netherlands, Sep. 5-7, 2000, pp. 96-101, IEEE Computer Society, 2000, ISBN 1089-6503.
Jolon Faichney, et al., Goldleaf Hierarchical Document Browser, Second Australian User Interface Conference (AUIC+01), Gold Coast, Queensland, Australia, Jan. 29-Feb. 1, 2001, pp. 13-20, IEEE Computer Society, 2001, ISBN 0-7695-0969-X.
Dino Esposito, New Graphical Interface: Enhance Your Programs with New Windows XP Shell Features, MSDN Magazine, Nov. 2001, vol. 16, No. 11.
Stuart Yeates, et al., Tag Insertion Complexity, Data Compression Conference, (DCC 2001), Snowbird, Utah, USA, Mar. 27-29, 2001,pp. 243-252, IEEE Computer Society2001, ISBN 1068-0314.
Bipin C. Desal, et al., Resource Discovery: Modeling, Cataloguing and Searching, Seventh International Workshop on Database and Expert Systems Applications (DEXA'96), Zurich, Switzerland, Sep. 9-10, 1996, pp. 70-75, IEEE-CS Press, 1996, ISBN 0-8186-7662-0.
Gulrukh Ahanger, et al., Automatic Composition Techniques for Video Production, IEEE Transactions on Knowledge and Data Engineering, Nov./Dec. 1998, pp. 967-987, vol. 10, No. 6, IEEE Computer Society, 1998, ISBN 1041-4347.
Jane Hunter, An Overview of the MPEG-7 Description Language (DDL), IEEE Transactions on Circuits and Systems for Video Technology, Jun. 2001, pp. 765-772, vol. 11, No. 6, IEEE Computer Society, 2001, ISBN 1051-8215.
Philippe Salembier, et al., MPEG-7 Multimedia Description Schemes, IEEE Transactions on Circuits and Systems for Video Technology, Jun. 2001, pp. 748-759, vol. 11, No. 6, IEEE Computer Society , 2001, ISBN 1051-8215.
Thomas Sikora, The MPEG-7 Visual Standard for Content Description —An Overview, IEEE Transactions on Circuits and Systems for Video Technology, Jun. 2001, pp. 696-702, vol. 11, No. 6, IEEE Computer Society, 2001, ISBN 1051-8215.
B.S. Manjunath, et al., Color and Texture Descriptors, IEEE Transactions on Circuits and Systems for Video Technology, Jun. 2001, pp. 703-715, vol. 11, No. 6, IEEE Computer Society, 2001, ISBN 1051-8215.
"Predefined Properties" http://help.sap.comlsaphelp—ep50sp5/helpdate/en/la/9a4a3b80f2ec40aa7456bc87a94259/content.htm.
"Info Vision Infonnation Management System" http://66.1 02. 7.1 04/search?q=cache:m IXV6K6sQOQJ:www.amlib.netlproducts/infovision.htm+customised+mult+property+file+navigation &hl=en.
"Previewing Files in the Common Dialog" http://www .elitevb.comlcontentiO 1,0084,0 II.
"TdcFolderLIstView component" http://www.appcontrols.comlmanualsldiskcontrols/index.htm1?tdcfolderlistview.htm.
"Previewing Files" http://developer.apple.comldocumentation/QuickTimeIINMAC/QT/iqMovieToolbox.1a.htm.
"Text File Previewer 2.0 Beta" http://ww .freedownloadscenter.comlUtiltiesText—ViewerslText- File ]reviewer.html.
"Your Next OS: Windows 2006?" http://www.pcworld.comlnewiarticle/O.aid.II3'631.OO.asp.
"GetOpenFileName Function," downloaded from <http://msdn.microsoft.com>; date of first publication prior to Mar. 28, 2005; 2 pages.
"GetSaveFileName Function," downloaded from <http://msdn.microsoft.com>; date first publication prior to Mar. 28. 2005; 2 pages.
"Using Common Dialog Boxes," downloaded from http://msdn.microsoft.com>; date of first publication prior to Mar. 28, 2005; 8 pages.
"How to Use a Common Dialog File Open Dialog with Win32 API," downloaded from <http://support.microsoft.com>; date of first publication prior to Mar. 28, 2005; 3 pp.
"Creating and Enhanced Metafile," downloaded from <http://msdn.microsoft.com>; date to first publication prior to Mar. 28. 2005; 2 pages.
"Common Dialog Box Library," downloaded from <http://msdn.microsoft.com>: date of first publication prior to Mar. 28, 2005; 8 pages.
"Openfilename Structure," downloaded from <http://msdn.microsoft.com>; date of first publication prior to Mar. 28, 2005; 7 pages.
"Open and Save as Dialog Boxes," downloaded from <http://msdn.microosft.com>; date of first publication prior to Mar. 29, 2005; 9 pages.

"Customizing common dialog boxes," downloaded from http://msdn.microsoft.com; date for first publication prior to Apr. 20, 2005, 4 pages.

G.D. Venolia, et al., Supporting Email Workflow. Microsoft Research Technical Report MSR-TR-2001-88. Revised Dec. 2001 (Orginal Sep. 2001). Microsoft Corporation, Redmond, WA.

G.D. Venolia and C. Neustaedter. Understanding Sequence and Reply Relationhips within Email Converstations: A Mixed-Model Visualization. Microsoft Research Technical report MSR-TR-2002-102. Sep. 23, 2002 (Revised Jan. 13, 2003.

Microsoft Digital Image Suite User's Manual, Version 9.0 pp. 105-118, Available: http://www.microsoft.com/products/imaging/guides/SuiteManual.pdf, Apr. 30, 2004.

"Using Tags to Organize Your Photos.", Adobe Photoshop Album 2.0 Tutorial, Available: http://www.adobe.com/digitaliamg/tips/phsaltaggin/pdfs/phsaltaggin.pdf, Apr. 30, 2004.

Examples of dialogs user interfaces; date of first publication prior to Mar. 31, 2005; 8 pages.

"Visually Theming and Styling Your Applications and Documents" (CLI 308); downloaded from http://msdn.microsoft.com/longhorn/pdcmaterials/pdctalksavalon/>; date of first publication prior to Mar. 31, 2005; 34 pages.

New User Interface Possibilities in Longhorn (CLI 304); downloaded from <http:msdn.microsoft.com/longhorn/pdcmaterials/pdctalksavalon/>; date of first publication prior to Mar. 31, 2005; 45 pages.

Windows Forms: Exploiting Windows Longhorn "Features from Within Your Application" (CLI 391); downloaded from http://msdn.microsoft.com/longhorn/pdcmaterials/pdctalksavalon/>; date of first publication prior to Mar. 31, 2005; 27 pages.

MessageBox Function: downloaded from http://msdn.microsoft.com>; date of first publication prior to Mar. 31, 2005; 4 pages.

Creating and Installing Theme Files; downloaded from http://msdn.microsoft.com>; date of first publication prior to Feb. 21, 2005; 4 pages.

"MessageBox Function"; downloaded from http://msdn.microsoft.com>; date of first publication prior to Mar. 31, 2005; 4 pages.

"Creating and Installing Theme Files"; downloaded from http://msdn.microsoft.com>; date of first publication prior to Feb. 21, 2005; 4 pages.

"About Dialog Boxes"; downloaded from <http://msdn.microsoft.com>; date of first publication prior Feb. 21, 2005; 10 pages.

"Property Sheets and Inspectors"; downloaded from <http://msdn.microsoft.com>; date of first publication prior to Feb. 21, 2005; 6 pages.

"Propsheetpage"; downloaded from <http://msdn.microsoft.com>; date of first publication prior to Feb. 21, 2005; 3 pages.

"DialogProc Function"; downloaded from <http://msdn.microsoft.com>; date of first publication prior to Feb. 21, 2005; 2 pages.

"Creating Wizards"; downloaded from <http://msdn.microsoft.com>; date of first publication prior to Mar. 31, 2005; 17 pages.

"Properties Sheets"; downloaded from <http://msdn.microsoft.com>; date of first publication prior to Mar. 31, 2005; 7 pages.

"Property Sheet Reference"; downloaded from <http://msdn.microsoft.com>; date of first publication prior to Mar. 31, 2005; 5 pages.

"Drawitemstruct Structure"; downloaded from <http://msdn.microsoft.com>; date of first publication prior to Feb. 25, 2005; 3 pages.

"Using Buttons"; downloaded from <http://msdn.microsoft.com>; date of first publication prior to Feb. 25, 2005; 5 pages.

Button Messages; downloaded from <http://msdn.microsoft.com>; date of first publication prior to Feb. 25, 2005; 4 pages.

"Button Styles"; downloaded from <http://msdn.microsoft.com>; date of first publication prior to Feb. 25, 2005; 2 pages.

"CreateWindow Function"; downloaded from <http://msdn.microsoft.com>; date of first publication prior to Feb. 25, 2005; 5 pages.

"Using Dialog Boxes"; downloaded from <http://msdn.microsoft.com>; date of first publication prior to Mar. 31, 2005; 8 pages.

"CreatePropertySheetPage Function"; downloaded from <http://msdn.microsoft.com>; date of first publication prior to Mar. 31, 2005; 1 page.

"DestroyPropertySheetPage Function"; downloaded from <http://msdn.microsoft.com>; date of first publication prior to Mar. 31, 2005; 1 page.

"PropertySheet Function"; downloaded from <http://msdn.microsoft.com>; date of first publication prior to Mar. 31, 2005; 2 pages.

"PropSheetPageProc Function"; downloaded from <http://msdn.microsoft.com>; date of first publication prior to Mar. 31, 2005; 2 pages.

"PropSheetProc Function"; downloaded from <http://msdn.microsoft.com>; date of first publication prior to Mar. 31, 2005; 2 pages.

"PSN_Killactive Notification"; downloaded from <http://msdn.microsoft.com>; date of first publication prior to Mar. 31, 2005; 1 page.

"PSN_Querycancel Notification"; downloaded from <http://msdn.microsoft.com>; date of first publication prior to Mar. 31, 2005; 1 page.

"PSN_Reset Notification"; downloaded from <http://msdn.microsoft.com>; date of first publication prior to Mar. 31, 2005; 1 page.

"PSN_Setactive Notification"; downloaded from <http://msdn.microsoft.com>; date of first publication prior to Mar. 31, 2005; 1 page.

"PSN_Translateaccelerator Notification"; downloaded from <http://msdn.microsoft.com>; date of first publication prior to Mar. 31, 2005; 1 page.

"PSN_Wizback Notification"; downloaded from <http://msdn.microsoft.com>; date of first publication prior to Mar. 31, 2005; 3 pages.

"PSN_Wizfinish Notification"downloaded from <http://msdn.microsoft.com>; date of first publication prior to Mar. 31, 2005; 1 page.

"PSN_Wiznext Notification"; downloaded from <http://msdn.microsoft.com>; date of first publication prior to Mar. 31, 2005; 3 pages.

"PSM_Addapage Message"; downloaded from <http://msdn.microsoft.com>; date of first publication prior to Mar. 31, 2005; 2 pages.

"PSM_Idtoindex Message"; downloaded from <http://msdn.microsoft.com>; date of first publication prior to Mar. 31, 2005; 1 page.

"PSM_Indextohwnd Message"; downloaded from <http://msdn.microsoft.com>; date of first publication prior to Mar. 31, 2005; 1 page.

"PSM_Indextoid Message"; downloaded from <http://msdn.microsoft.com>; date of first publication prior to Mar. 31, 2005; 1 page.

"PSM_Indextpopage Message"; downloaded from <http://msdn.microsoft.com>; date of first publication prior to Mar. 31, 2005; 1 page.

"PSM_Pagetoindex Message"; downloaded from <http://msdn.microsoft.com>; date of first publication prior to Mar. 31, 2005; 1 page.

"PSM_Pressbutton Message"; downloaded from <http://msdn.microsoft.com>; date of first publication prior to Mar. 31, 2005; 1 page.

"PSM_Querysiblings Message"; downloaded from <http://msdn.microsoft.com>; date of first publication prior to Mar. 31, 2005; 1 page.

"PSM_Setcursel Message"; downloaded from <http://msdn.microsoft.com>; date of first publication prior to Mar. 31, 2005; 1 page.

"PSM_Setcurselid Message"; downloaded from <http://msdn.microsoft.com>; date of first publication prior to Mar. 31, 2005; 1 page.

"PSM_Setfinishtext Messge"; downloaded from <http://msdn.microsoft.com>; date of first publication prior to Mar. 31, 2005; 1 page.

"PSM_Setheadertitle Message"; downloaded from <http://msdn.microsoft.com>; date of first publication prior to Mar. 31, 2005; 1 page.

"PSM_Setwizbuttons Message"; downloaded from <http://msdn.microsoft.com>; date of first publication prior to Mar. 31, 2005; 2 pages.

"Propsheetheader Structure" ; downloaded from <http://msdn.microsoft.com>; date of first publication prior to Mar. 31, 2005; 5 pages.

"Propsheetpage Structure"; downloaded from <http://msdn.microsoft.com>; date of first publication prior to Mar. 31, 2005; 4 pages.

"Pshnotify Structure"; downloaded from <http://msdn.microsoft.com>; date of first publication prior to Mar. 31, 2005; 1 page.

"BCM_Getidealsize Message"; downloaded from <http://msdn.microsoft.com>; date of first publication prior to Mar. 31, 2005; 1 page.

"PSM_Settitle Message"; downloaded from <http://msdn.microsoft.com>; date of first publication prior to Mar. 31, 2005; 1 page.

A.T. McCray, et al., Extending the Role of Metadata in a Digital Library System, May 19, 1999, IEEE, pp. 190-199

Alexa T. McCray, et al., Principles for Digital Library Development, May 2001, ACM, pp. 49-53.

Stelovsky, J., and C. Aschwanden, "Software Architecture for Unified Management of Event Notification and Stream I/O and Its Use for Recording and Analysis of User Events," *Proceedings of the 35th Annual Hawaii International Conference on System Sciences*IEEE Computer Society, Big Island, Hawaii, Jan. 7-10, 2002, p. 1862-1867.

"About Managing With Rules", Microsoft® Outlook® 2003 Help file, 3 pp.

"Trillian/Trillian Pro IM Clients" Products Description, ©1999-2004 Cerulean Studios, <http://www.ceruleanstudios.com> [retrieved Apr. 30, 2004].

International Search Report of WO2004/097638 A1 (McKee, et al.) dated Nov. 11, 2004.

Microsoft Windows XP Version 2002 (Screen Dumps, Figs. 1-16).

Simpson, Alan, Windows 95 Uncut, 1995, IDG Book Worldwide, Inc., pp. 104-107.

Feng, et al., "Schemata Transformation of Object-Oriented Conceptual Models to XML", Computer systems Science & Engineering, vol. 18, No. 1, Jan. 2003.

Joseph, M., "The UML for Data Modellers," Elektron, Apr. 2004, pp. 72-73.

Wang, G., et al., "Extrending XML Schema with Nonmonotonic Inheritance," in M.A. Jesufeld and O. Paster (eds.) ER 2003 Workshops, Lecture Notes in Computer Science 2814:402-407,2003.

Adobe, Inc., et al., "Adobe Photoshop CS Classroom in a Book," Dec. 1, 2003, pp. 1-29.

Adobe, Inc., et al., "Adobe Photoshop 7.0", 2001; pp. 1-9.

Heinlein, et al., "Integration of Message Passing and Shared Memory in the Stanford Flash Multiprocessor, Architecture Support for Programming Languages and Operating Systems," pp. 38-50, published 1994.

Louis, et al., "Context Learning Can Improve user Interaction Information Reuse and Intergration," Proceedings of the 2004 IEEE International Conference on, pp. 115-120, Nov. 8-10, 2004.

Cohen, et al., "A Case for Associative Peer to Peer verlays" —ACM SIGCOMM Computer Communications Review, vol. 33, No. 1, Jan. 2003, pp. 95-100.

Lui, et al., "Interoperability of Peer to Peer File Sharing Protocols" —ACM SIGecomm Exchanges, vol. 3, No. 3, Aug. 2002, pp. 25-33.

McFedries, Paul; "The Complete Idiot's Guide to Windows XP", Table of Contents, Oct. 3, 2001; Alpha Books, Ch. 6: Using My Computer to Fiddle w/h Files and Folder-printed p. 1-6, Finding a File in Mess p. 103.

Langer, Maria, MAc OS X: Visual QuickStart Guide: Apr. 2001, Peachpit Press, Mac OS X Disk Organization (pp. 1-3), Views (pp. 1-11), Outlines (1-3).

Ray, Jay, Mac OS X Unleashed, Nov. 2001, Sams, Chapter 4. The Finder: Working with Files and Applications (pp. 1-15), Getting File Information (pp. 1-7).

International Search Report and Written Opinion of PCT/US04/25931 dated Apr. 3, 2007.

Kuchinsky, et al., "FotoFile: A Consumer Mulitmedia Organization and Retrieval System", May 1999, ACM pp. 496-503.

Written Opinion of SG 200301764-7 dated Jan. 11, 2007.

Windows Commander (website), <URL: http://www.ghisler.com>, accessed using http://www.archive.org/web/web.php, in particular, http://web.archive.org/web/20030207145141/www.ghisler.com/featurel.htm, archived on Feb. 7, 2003; http://web.archive.org/web/20021017022627/www.ghisler.com/addons.htm, archived Oct. 17, 2002; http://web.archive.org/web/20021009213316/www.ghisler.com/efaquser.htm, archived on Oct. 9, 2003; unable to access website.

Bott, et al., "Microsoft Windows XP Inside Out", Microsoft Press, 2001, Chapter 11, 33 pages.

Bott, et al., Book titled "Special Edition Using Windows 98, Second Edition", Dec. 21, 1999, second edition, pp. 1-7.

Supplementary European Search Report for EP 04780390 dated Jun. 18, 2007.

Written Opinion of Singapore Appliation No. 200403220-7 dated May 18, 2006.

European Search Report for 03007909.9-2211 dated Jun. 30, 2006.

D. Esposito, "More Windows 2000 UI Goodies: Extending Explorer Views by Customizing Hypertext Template Files", MSDN Magazine, <http://msdn.microsoft.com/msdnmag/issue/0600/w2ui2/default.aspx?print=true?, first date of publication unknown but no later than Jun. 2000, 15 pages.

Microsoft: "Microsoft Windows 2000 Professional Step By Step—Lesson 3—Managing Files and Folders" <http://www.microsoft.com/mspress/books/sampshap/1589.asp.>, Jan. 5, 2000, 12 pages.

Australian Search Report for SG 200301764-7 dated Mar. 30, 2006.

D. Esposito, Visual C++ Windows Shell Programming, Dec. 1, 1998, Apress, ISBN 1861001843, pp. 463-469.

P. DiLascia, "More Fun with MFC:DIBs, Palettes, Subclassing, and a Gamut of Goodies, Part III", Microsoft Systems Journal, Jun. 1997, 20 pages.

Australian Written Opinion for SG 200301764-7 dated Mar. 30, 2006.

Windows Commander, <http://web.archive.org/web/20030207145141/www.ghisler.com/featurel.htm> (Feb. 7, 2003) and <http://web.archive.org/web/20021017022627/www.ghisler.com/addons.htm> (Oct. 17, 2002), 7 pages.

Directory Opus 6.1—Viewer SDK Plugin SDK 1.0, GP Software, 2001, <http://web.archive.org/web/20030219151121/www.gpsoft.com.au/Developer.html>, first date of publication unknown but, prior to Feb. 19, 2003, 30 pages.

Microsoft Press Pass, "Windows XP is Here!", New York, Oct. 25, 2001.

Microsoft, "Microsoft Windows XP Professional Product Documentation" section: (1) To Change how you view items in a folder, (2) Viewing files and folders overview, (3) To associate a film with a program, (4) To Change or remove a progeam, copyright 2006, publication date unknown.

McFedries, Paul, "The Complete Idiot's Guide to Windows XP", Table of Contents, Oct. 3, 2001; Alpha Books, Chapter 8: A Tour of the My Pictures Folder—printed pages 1-8, Chapter 11: Sights and Sounds: Music and Other Multimedia-printed pp. 1-3.

Stanek R. William, "Microsoft Windows XP Professional Administrator's Pocket Consultant", Sep. 25, 2001; Microsoft Press, Chapter 9, printed pp. 1-8.

Shah, Sarju, "Windows XP Preview", FiringSquad, May 4, 2001, online, printed pp. 1-5; Figure: Hi-Res Image Viewer.

Wikipedia, File Allocation Table, 2006, <http://en.wikipedia.org/wik/File_Allocation_Table>.

* cited by examiner

FILTERING A COLLECTION OF ITEMS

FIELD OF THE INVENTION

Aspects of the present invention are directed generally to filtering a collection of items such as files, and more particularly to providing a user interface that allows a user to filter a collection of items and to conveniently view the result of the filtering as well as the filtering context.

BACKGROUND OF THE INVENTION

Current computer operating systems contain files that are organized into a set of folders. Any item in an operating system resides in only one folder. Such an architecture imposes burdensome restrictions on users who want to organize their files in more flexible ways. Many operating systems are now beginning to be developed that allow users to organize their files in accordance with richer properties so that users can, for example, quickly see all files created by a particular author or all pictures taken on a specific date, regardless of which folders the files are be located in.

When presented with a large number of files at once, it may be desirable to be able to filter those files so that a reduced subset of the those files will be presented that are hopefully more relevant to the user. The concept of filtering differs from the concept of searching. In filtering, one typically begins with a known population of files and narrows that population down to a subset that is hopefully easier to manage. For example, a user might easily have thousands of documents on their computer's hard drive, and filtering would be desirable in this case to narrow that set down to the relative few that the user is likely to be interested in. On the other hand, in searching, one typically begins with the idea that there is no population, but that a result population will be formed based on the search criteria.

One of the problems with filtering is communicating to the user a context of the filtering. In other words, after filtering, the user does not know which set of files the user started with as compared with the files that have been subsequently filtered. In many filtering systems, the filtered-out files simply disappear from the screen, making it difficult for the user to see what proportion of items they are left with from the whole, or what context those items were in before they were filtered.

SUMMARY OF THE INVENTION

Aspects of the present invention are directed to visually representing a set of items as a set of item representations (such as icons or thumbnails), and visually identifying within that set of items which subset has been filtered out by the user in accordance with a user-defined criterion. All of the item representations are displayed on the screen in some form, regardless of which of the items have been filtered out. This can be advantageous from an end user experience perspective because it allows the user to easily visualize the relationship between the filtered and unfiltered items.

Further aspects of the present invention are directed to displaying the item representations in arrays or carousels as appropriate to visually distinguish between those items that have been filtered out and those that are considered relevant.

Still further aspects of the present invention are directed to visually indicating the relationship of the relevant items to the user-defined criterion. For example, each of the relevant item representations may be color-coded to indicate its relationship to a simultaneously displayed color-coded keyword.

These and other aspects of the invention will be apparent upon consideration of the following detailed description of illustrative embodiments.

BRIEF DESCRIPTION OF THE DRAWINGS

The foregoing summary of the invention, as well as the following detailed description of illustrative embodiments, is better understood when read in conjunction with the accompanying drawings, which are included by way of example, and not by way of limitation with regard to the claimed invention.

DETAILED DESCRIPTION OF ILLUSTRATIVE EMBODIMENTS

Illustrative Computing Environment

Figure 1:
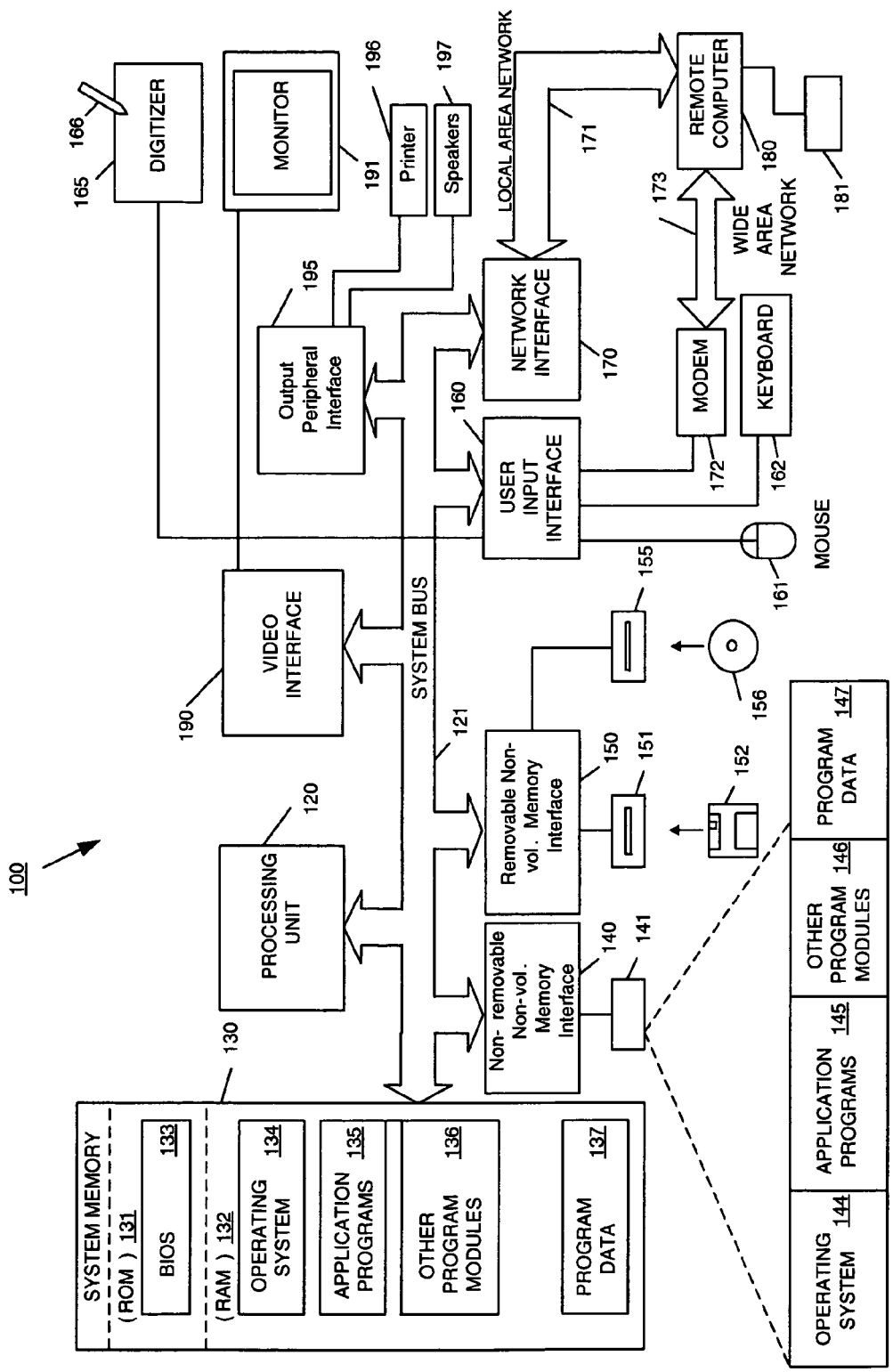
FIG. 1 is a functional block diagram of an illustrative computer in accordance with at least one aspect of the present invention.

Aspects of the present invention may be used in connection with a computing device such as the computer 100 illustratively shown in FIG. 1. Components of the computer 100 may include, but are not limited to, a processing unit 120, a system memory 130, and a system bus 121 that couples various system components including the system memory 130 to the processing unit 120. The system bus 121 may include any of several types of bus structures including a memory bus or memory controller, a peripheral bus, and/or a local bus using any of a variety of bus architectures.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in the ROM 131. The RAM 132 typically contains data and/or program modules that are immediately accessible to and/or presently being operated on by processing unit 120. The computer 100 may also store and/or execute an operating system 134, one or more application programs 135, other program modules 136, and/or program data 137. The computer 100 may further include other removable/non-removable, volatile/nonvolatile computer storage media. By way of example only, FIG. 1 illustrates a hard disk drive 141 that reads from and/or writes to non-removable, nonvolatile magnetic media, a magnetic disk drive 151 that reads from and/or writes to a removable nonvolatile magnetic disk 152, and an optical disk drive 155 that reads from and/or writes to a removable, nonvolatile optical disk 156 such as a CD ROM or other optical media. Other removable/non-removable and volatile/nonvolatile computer storage media that may be used include, e.g., magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150. Data stored on any of the various computer storage media may be stored in a variety of formats. For example, data may be stored as discrete portions such as files or other items. An electronic file system, which may be part of the operating system 134 and/or separate from it, may be responsible for managing the storage, retrieval, and/or searching of items and other data on the computer storage media. The electronic file system may be implemented as software, hardware, and/or firmware.

A user may enter commands and information into the computer 100 through input devices such as a touch-sensitive device (e.g., digitizer) 165, or a keyboard 162 and/or a pointing device 161, commonly referred to as a mouse, trackball, or touch pad. Other input devices (not shown) may include a microphone, joystick, game pad, satellite dish, scanner, or the like. These and other input devices are often connected to the processing unit 120 through a user input interface 160 that is coupled to the system bus 121, but may be coupled via other interface and bus structures such as a parallel port, a game port, or a universal serial bus (USB). A monitor 191 or other type of display device is also connected to the system bus 121 via an interface such as a video interface 190. The computer 100 may further include other peripheral output devices such as speakers 197 and printer 196, which may be connected to the system bus 121 via an output peripheral interface 195.

The computer 100 may operate in a networked environment using logical connections to one or more remote computers, such as a remote computer 180. The remote computer 180 may be a personal computer (such as a desktop computer, a laptop computer, or a tablet-style computer), a handheld computer (e.g., a personal digital assistant), a server, a router, a network PC, a peer device, or other common network node, and typically includes many or all of the elements described above relative to the computer 100, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet. The computer 100 may further include wired and/or wireless capabilities. For example, the network interface 170 may be BLUETOOTH, SWLan, and/or IEEE 802.11 compatible. It is appreciated that other wireless communication protocols may be used in conjunction with these protocols or in place of these protocols.

When used in a LAN networking environment, the computer 100 is connected to the LAN 171 through a network interface or adapter 170. When used in a WAN networking environment, the computer 100 typically includes a modem 172 or other means for establishing communications over the WAN 173, such as the Internet. The modem 172, which may be internal or external, may be connected to the system bus 121 via the user input interface 160 or other appropriate mechanism.

First Illustrative User Interface

Figure 2:
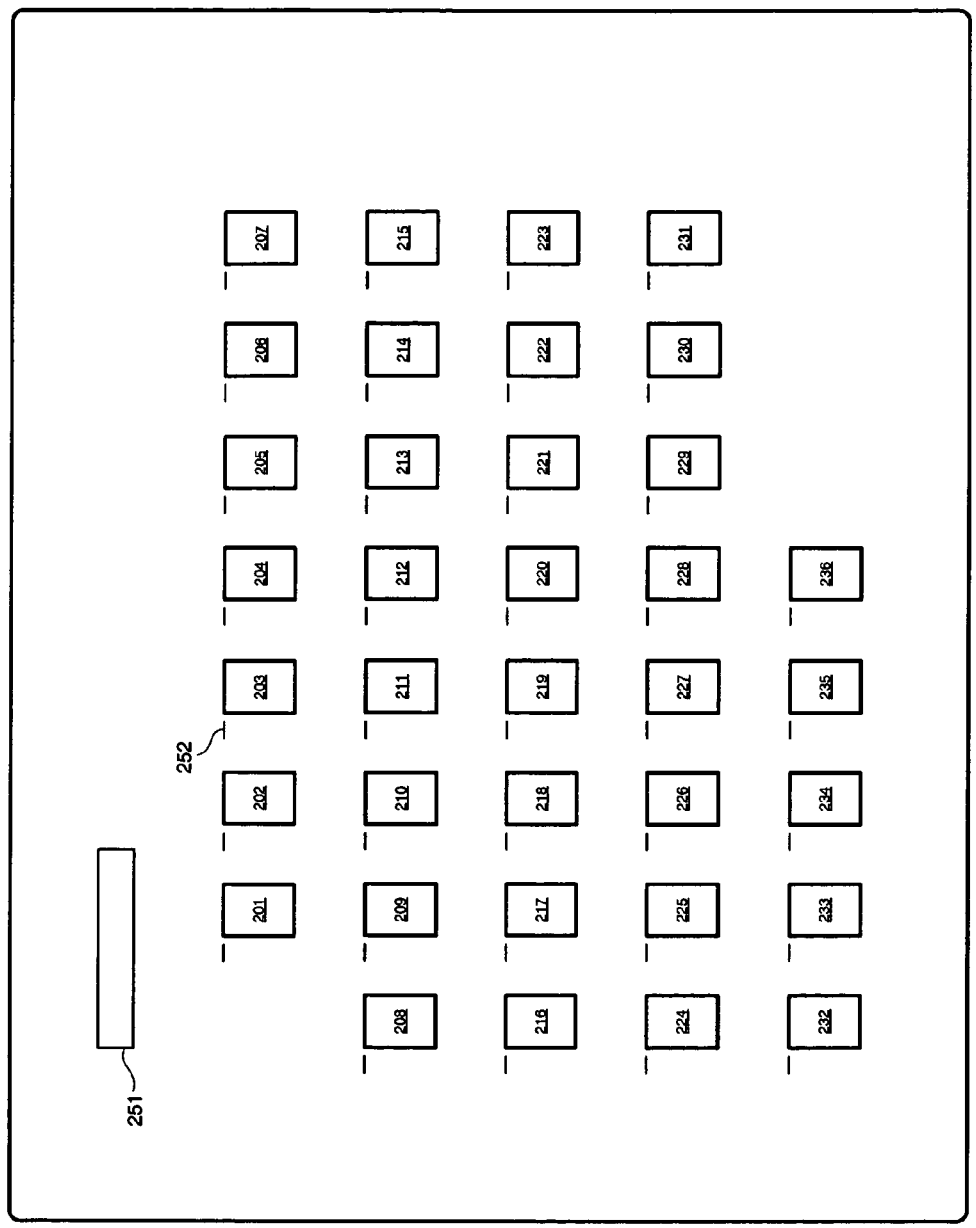
FIG. 2 is a screenshot of an illustrative graphical user interface including an array of item representations, in accordance with at least one aspect of the present invention.

Referring to FIG. 2, a graphical user interface is shown that may be generated by computer 100 and displayed on a display such as monitor 191. The user interface may include a plurality of item representations 201 to 236, each representing a different item. An item may be nearly any type of discrete data structure, such as a file (such as a word processing document, a spreadsheet document, a photo, an MP3 song, etc.), a contact, a calendar item, an email, or even a grouping of items (such as a folder). Each item may be associated with its own item representation, which is a graphical and/or textual element that is displayed to the user and that represents the item. Manipulations to an item representation may cause actions to be taken on the item itself. For example, in response to the user dragging and dropping a file item representation into a folder item representation, computer 100 may cause the item associated with the file item representation to be stored in the folder associated with the folder item representation. Item representations may be displayed to the user in the form of a graphical and/or textual element, such as an icon or a thumbnail depiction of content of the associated item. For example, where an item is a photograph, its associated item representation may be a thumbnail version of the photograph content. Or, where the item is a word processing document, the item representation may be an icon indicating the type of item and/or the filename of the item. Both items and item representations are well-known in most graphical user-interface-based operating systems and software applications.

The user interface shown in FIG. 2 also include a text entry area 251 into which a user may enter typewritten text using keyboard 162 or handwritten text using a stylus (e.g., where the display is sensitive to the touch of the stylus, such as on a tablet-style computer). As will be discussed further, user input in text entry area 251 causes the plurality of item representations 201-236 to be filtered. Alternatively, other methods for providing user input may be used other than a text entry area. For example, the user may be able to select from a set of pre-defined filtering criteria, such as from a drop-down menu or by clicking on one of various displayed buttons each being associated with a different filtering criterion.

This illustrative embodiment of a user interface also includes a filter indicator for each of item representations 201-236. For example, item representation 203 is associated with a filter indicator 252. In this example, each filter indicator is a horizontal line near its respective item representation, the item representations 201-236 are aligned in a plurality of rows, which together form a two-dimensional array of item representations, and the filter indicators are vertically aligned with each other in each row. Of course, the shown filter indicator 252 is merely illustrative and may take any form as desired.

Each of the items may be associated with one or more keywords that may be arbitrary or may be descriptive of the items. For example, where an item is a word processing document, such as a business letter, written by a user named Andy, the item may be associated with the keywords "letter," "Andy," etc. If the document was created or saved on a particular date, then the date itself may additionally be a keyword associated with that item. Or, an item that is a photograph of a holly tree may be associated with the keywords "photograph," "tree," "berry," "twig," etc. Keywords may be automatically and/or manually assigned to items, and are not necessarily limited to alphabetic characters, but may be alphanumeric, graphical, and/or symbolic. In the following non-limiting examples, it will be assumed that the keywords are alphanumeric. Of course, any keywords may be assigned to an item. For example, it is possible that the above-mentioned photographic item of the tree may be associated with the keyword "bear," even though that word may have nothing to do with the actual photographic content. The keywords may be part of the item content itself or separate from the item content such as metadata.

Figure 3:
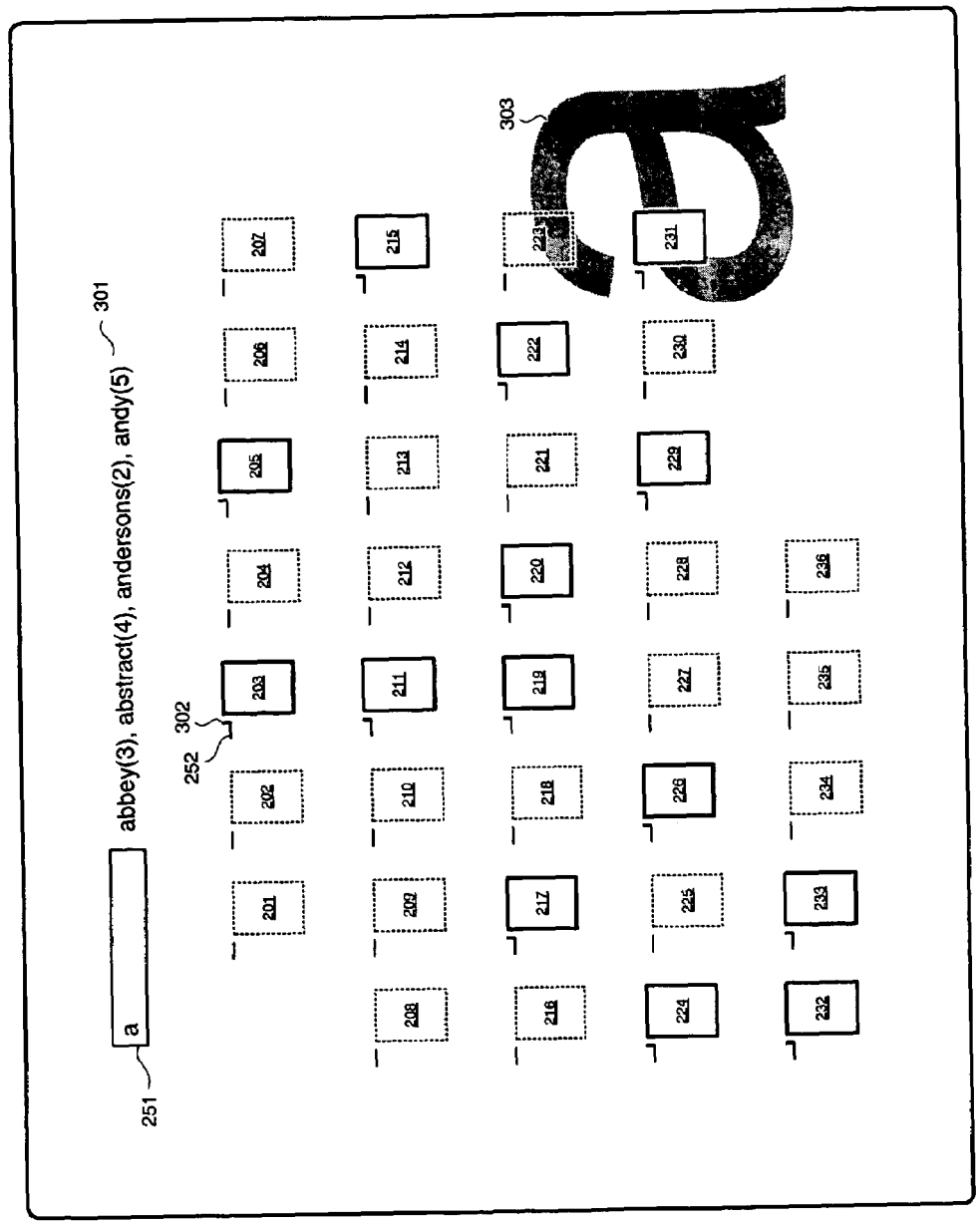
FIG. 3 is a screenshot of the graphical user interface of FIG. 2, wherein the item representations are filtered, in accordance with at least one aspect of the present invention.

Referring to FIG. 3, the user has now entered the letter "a" into text entry area 251. In response, computer 100 compares each of the plurality of items associated with item representations 201-236 and chooses a subset of the items based on the user input in text entry area 251. In this example, computer 100 may determine which of the items are associated with a keyword that satisfies the user input, such as by determining whether any keywords match, begin with, or contain anywhere within, the criterion defined by the user input. Alternatively, computer 100 may make a more complex or intelligent decision as to which of the items are relevant to the user-entered criterion. Such a decision may be based, not on keywords, but instead on an analysis of the content of or other metadata associated with each item. In this example, computer 100 determines a subset, if any, of those of the items that are associated with at least one keyword that begins with the letter "a". Computer 100 then identifies the outcome of this determination to the user by altering or maintaining, as appropriate) one or more display properties of the item representations associated with the items in the subset and/or the item representations associated with the remaining items. In this example, the fourteen items associated with item representations 203, 205, 211, 215, 217, 219, 220, 222, 224, 226, 229, 231, 232, and 233 are associated with a keyword beginning with the letter "a". These will be referred to herein as the first chosen subset.

To indicate the outcome of the determination to the user, computer 100 may cause the fourteen chosen item representations to become more visible relative to the remaining item representations. For example, the remaining item representations 201, 202, 204, 206-210, 212-214, 216, 218, 221, 223, 225, 227, 228, 230, and 234-236 may be made less visible to the user such as by reducing their displayed intensity and/or opacity. Alternatively or additionally, the first chosen subset of fourteen item representations may be made more visible to the user such as by increasing their displayed intensity and/or opacity. The intensity and/or opacity may be manipulated to cause the first chosen subset of item representations to "stand out" more to the user relative to the remaining item representations. Other display properties of the item representations may be additionally or alternatively manipulated to provide a similar visibility differentiation effect, such as the size, shape, color, and/or location of item representations. For instance, in the embodiment of FIG. 3, the first chosen subset of item representations are displaced upward out of their respective rows to make them more noticeable to the user, while the remaining item representations remain in their respective rows and their opacities are reduced (i.e., they become more transparent yet remain visible) as indicated in FIG. 3 using broken lines.

In general, a display property of a graphical element is any property that affects how the graphical element appears on a display. The size, shape, color, intensity, opacity, absolute position, and position relative to other graphical elements (e.g., in an array of multiple elements or in a carousel of multiple elements) are examples of display properties for a graphical element. These properties may each be more generally referred to as profiles. For example, an intensity profile may be a defined single intensity (such as an average intensity) or range of intensities, and an opacity profile may be a defined single opacity (such as an average opacity) or range of opacities. In accordance with the various embodiments discussed herein, any one or more display properties of an item representation may be altered to fit a particular profile or to be of a particular value in order to indicate whether or not the item representation satisfies the user input criterion provided in text input area 251.

Referring still to FIG. 3, the filter indicators may be altered to indicate which of the item representations 201-236 are part of the first chosen subset. For instance, filter representation 252 grows a vertical leg 302 that grows vertically our from its horizontal portion in accordance with the vertical displacement of its associated item representation 203. Other styles of filter indicators may be used and are readily envisioned.

The user interface of FIG. 3 may further display 301 those of the keywords associated with the items that match or otherwise meet the criteria of the user input in text entry area 251. In this example, the keywords that match are the keywords that begin with the letter "a" are "abbey," "abstract," "andersons," and "andy." The number of instances of each keyword may also be displayed to the user. In this example, the keyword "abbey" was found to be associated with three of the items, the keyword "abstract" was found to be associated with four of the items, the keyword "andersons" was found to be associated with two of the items, and the keyword "andy" was found to be associated with five of the items. In addition or alternatively, the total number of items in the first chosen subset (in this example, fourteen) may be displayed.

The user interface of FIG. 3 may further display a background 303 in a layer behind some or all of item representations 201-236 that depends upon the content of the user input in input entry area 251. In the present example, background 303 is shown to be the actual user input, "a", itself. However, background 303 may be any type of textual, photographic, and/or graphical background that dynamically updates in accordance to the content of the user input in input entry area 251. This may help the user understand what filtering computer 100 is performing at the present moment, without having to look specifically at the input entry area 251.

Figure 4:
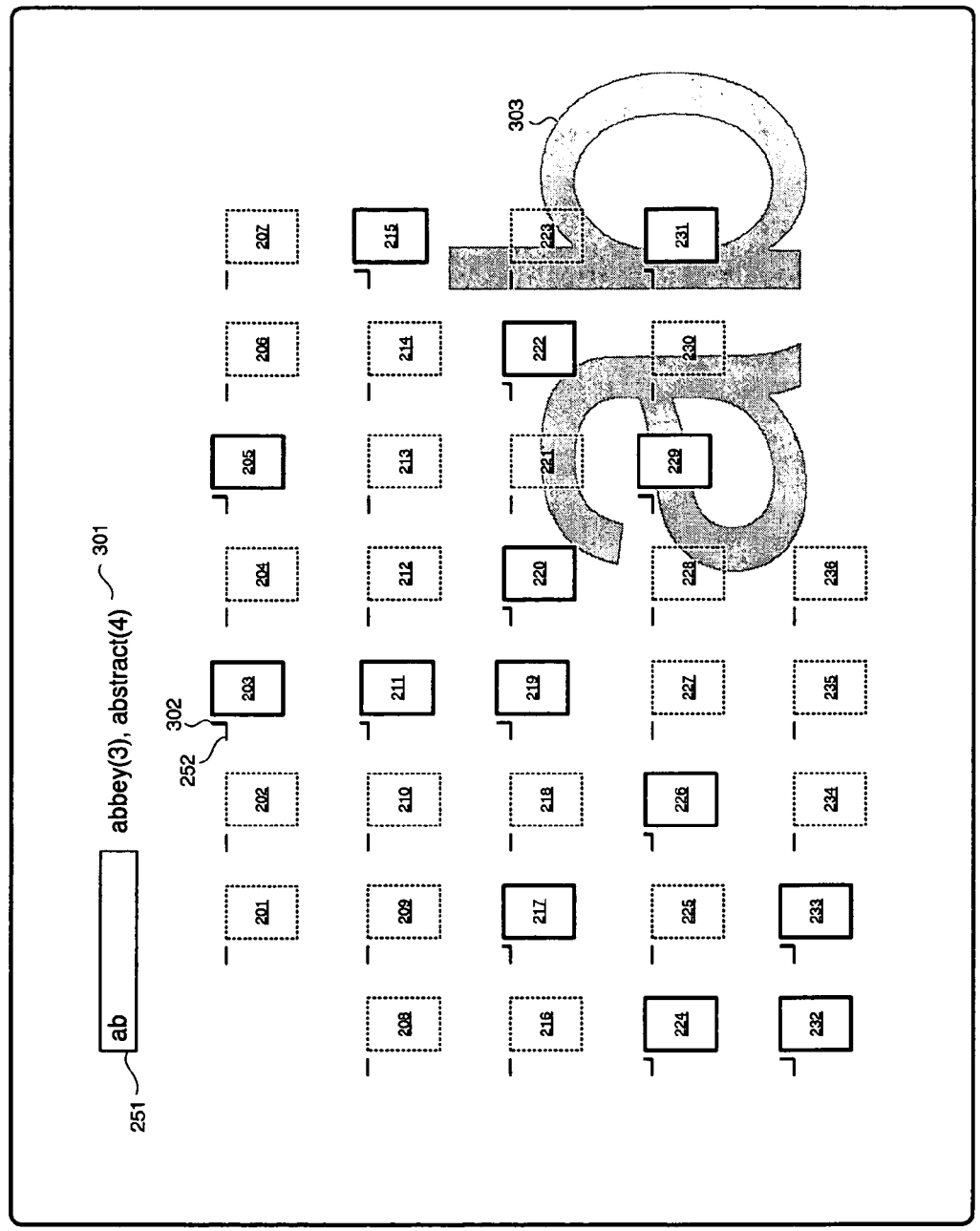
FIG. 4 is a screenshot of the graphical user interface of FIG. 3, wherein the item representations are further filtered, in accordance with at least one aspect of the present invention.

Referring to FIG. 4, the user has now added another character, "b," so that the user input in text entry area 251 is now "ab." In response, computer 100 determines which of the items are associated with keywords that begin with the user-input text, "ab." In this example, there are two keywords, "abbey," (three items) and "abstract" (four items) associated with a total of seven items. Of course, where one or more of the items in a chosen subset are each associated with more than one of the keywords for that chosen subset, the total number of items may be less than the sum for each keyword (e.g., less than seven items in this example). Computer 100 could search the entire set of items for keywords, or, since in this case the user has narrowed the text criteria from "a" to "ab," computer 100 could more efficiently search only the first chosen subset of items with the assumption that a matching keyword would not be found in association with the remaining items. In this example, the seven items that are associated with keywords beginning with "ab" are those that are associated with item representations 203, 205, 215, 219, 229, 232, and 233, which will be referred to herein as the second chosen subset.

Here, the display properties of the item representations in the second chosen subset and/or the remaining item representations may be further altered to further differentiate to the user which item representations are part of the second chosen subset and which are not. The display properties may be set so as to simultaneously visually distinguish between those of the item representations that are in the first chosen subset but not in the second chosen subset, those that are in the second chosen subset, and those that are in neither of the chosen subsets. For example, those item representations in the second chosen subset may be further displaced upward while the remaining item representations are not further upwardly displaced. Thus, the result as shown in the illustrative embodiment of FIG. 4 is that the item representations that are in neither the first nor the second chosen subsets (i.e., item representations 201, 202, 204, 206-210, 212-214, 216, 218, 221, 223, 225, 227, 228, 230, and 234-236) are displayed as partially transparent while the item representations in the first and second chosen subsets are displayed as fully opaque (or at least less transparent). Further, the item representations in the first chosen subset but not the second chosen subset (i.e., item representations 211, 217, 220, 222, 224, 226, and 231) are upwardly displaced by a first amount, and the item representations in the second chosen subset (i.e., item representations 203, 205, 215, 219, 229, 231, and 232) are upwardly displayed by a larger second amount. Moreover, the filter indicators for the item representations in the second chosen subset (but not for any other item representations), such as the vertical leg 302 of filter indicator 252, may likewise extend upwardly even further.

In addition, as can be seen in FIG. 4, background 303 has dynamically updated to reflect the current content of the user input in text entry area 251. Thus, in this example background 303 now shows "ab" behind some of the item representations.

Figure 5:
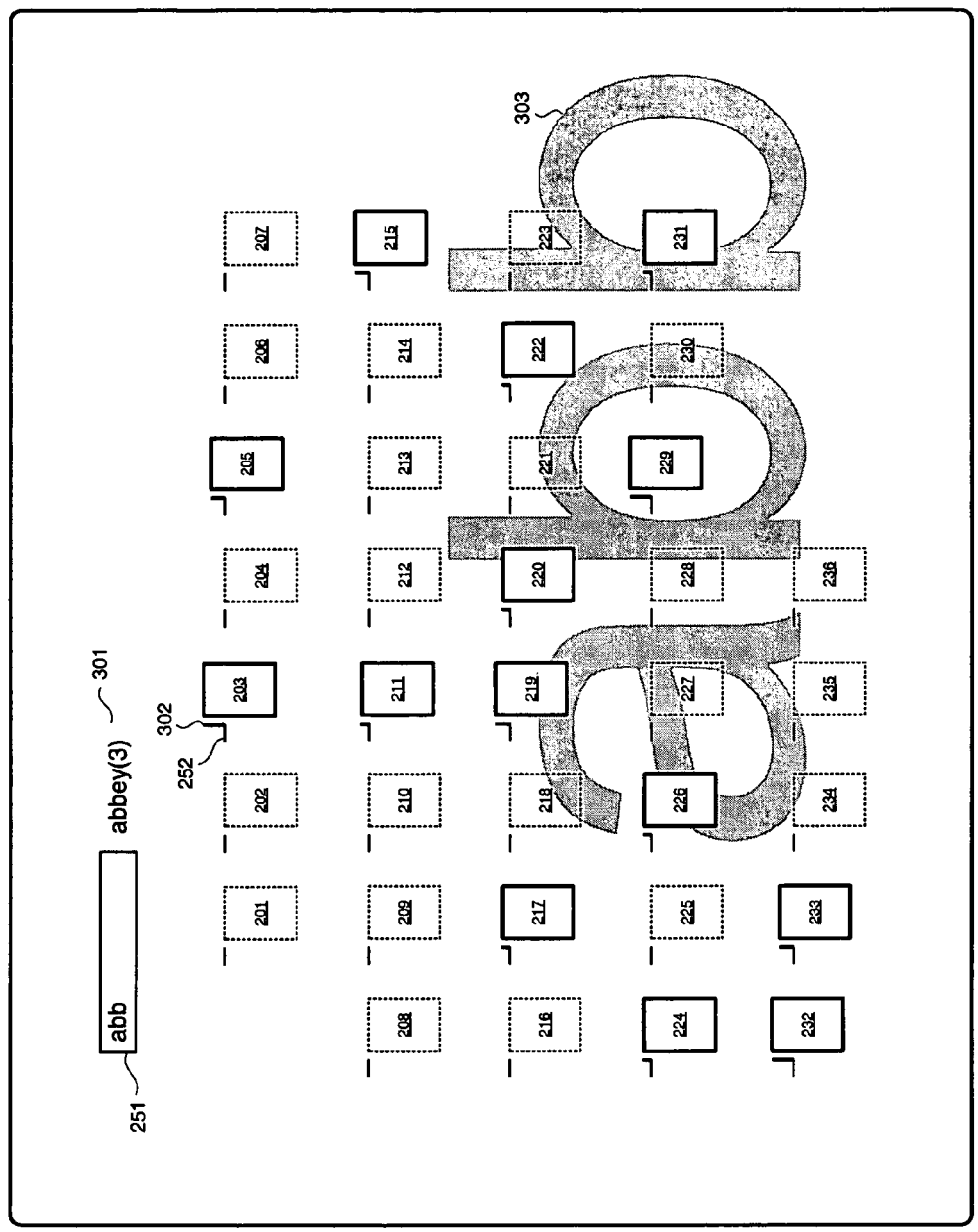
FIG. 5 is a screenshot of the graphical user interface of FIG. 4, wherein the item representations are still further filtered, in accordance with at least one aspect of the present invention.

Referring to FIG. 5, the user has now added another character, "b," so that the user input in text entry area 251 is now "abb." In response, computer 100 determines which of the items are associated with keywords that begin with the user-input text, "abb." In this example, there is only one keyword, "abbey" that meets this test. As indicated 301, this keyword is associated with three items. Again, computer 100 could search the entire set of items for matching keywords, or, since in this case the user has narrowed the text criteria from "ab" to "abb," computer 100 could more efficiently search only the second chosen subset of items with the assumption that a matching keyword would not be found in association with the remaining items. In this example, the three items that are associated with keywords beginning with "abb" are those that are associated with item representations 203, 229, and 232, which will be referred to herein as the third chosen subset.

The display properties of the item representations in the third chosen subset and/or the remaining item representations may be further altered to further differentiate to the user which item representations are part of the third chosen subset and which are not. The display properties may be set so as to simultaneously visually distinguish between those of the item representations that are in the first chosen subset but not in the second chosen subset, those that are in the second chosen subset but not in the third chosen subset, those that are in the third chosen subset, and those that are not in any of the chosen subsets. For example, those item representations in the third chosen subset may be further displaced upward while the remaining item representations are not further upwardly displaced. Thus, the result as shown in the illustrative embodiment of FIG. 5 is that the item representations that are in neither the first, second, nor third chosen subsets (i.e., item representations 201, 202, 204, 206-210, 212-214, 216, 218, 221, 223, 225, 227, 228, 230, and 234-236) are displayed as partially transparent while the item representations in the first and second chosen subsets are displayed as fully opaque (or at least less transparent). Further, the item representations in the first chosen subset but not the second chosen subset (i.e., item representations 211, 217, 220, 222, 224, 226, and 231) are upwardly displaced by the first amount previously discussed, the item representations in the second chosen subset (i.e., item representations 203, 205, 215, 219, 229, 231, and 232) are upwardly displaced by the larger second amount previously discussed, and the item representations in the third chosen subset (i.e., item representations 203, 229, and 232) are upwardly displaced by a third amount larger than the second amount. Moreover, the filter indicators for the item representations in the third chosen subset (but not for any other item representations), such as the vertical leg 302 of filter indicator 252, may likewise extend upwardly even further.

In addition, as can be seen in FIG. 5, background 303 has dynamically updated to reflect the current content of the user input in text entry area 251. Thus, in this example background 303 now shows "abb" behind some of the item representations. This background 303 is shown only in connection with the illustrative user interface of FIGS. 2-5, however it may be used in any of the illustrative user interfaces described herein.

Also, although item representations 201-236 are shown in neat horizontal rows and vertical columns, they need not be arranged in such a manner. They may be arranged in any other fashion such as randomly or in some other haphazard manner, in a single row or a single column, in a circular arrangement, etc. For example, as will be discussed in connection with FIG. 6, item representations (those that are part of a chosen subset and/or not part of a chosen subset) may be arranged and grouped as a carousel.

Second Illustrative User Interface

Figure 6:
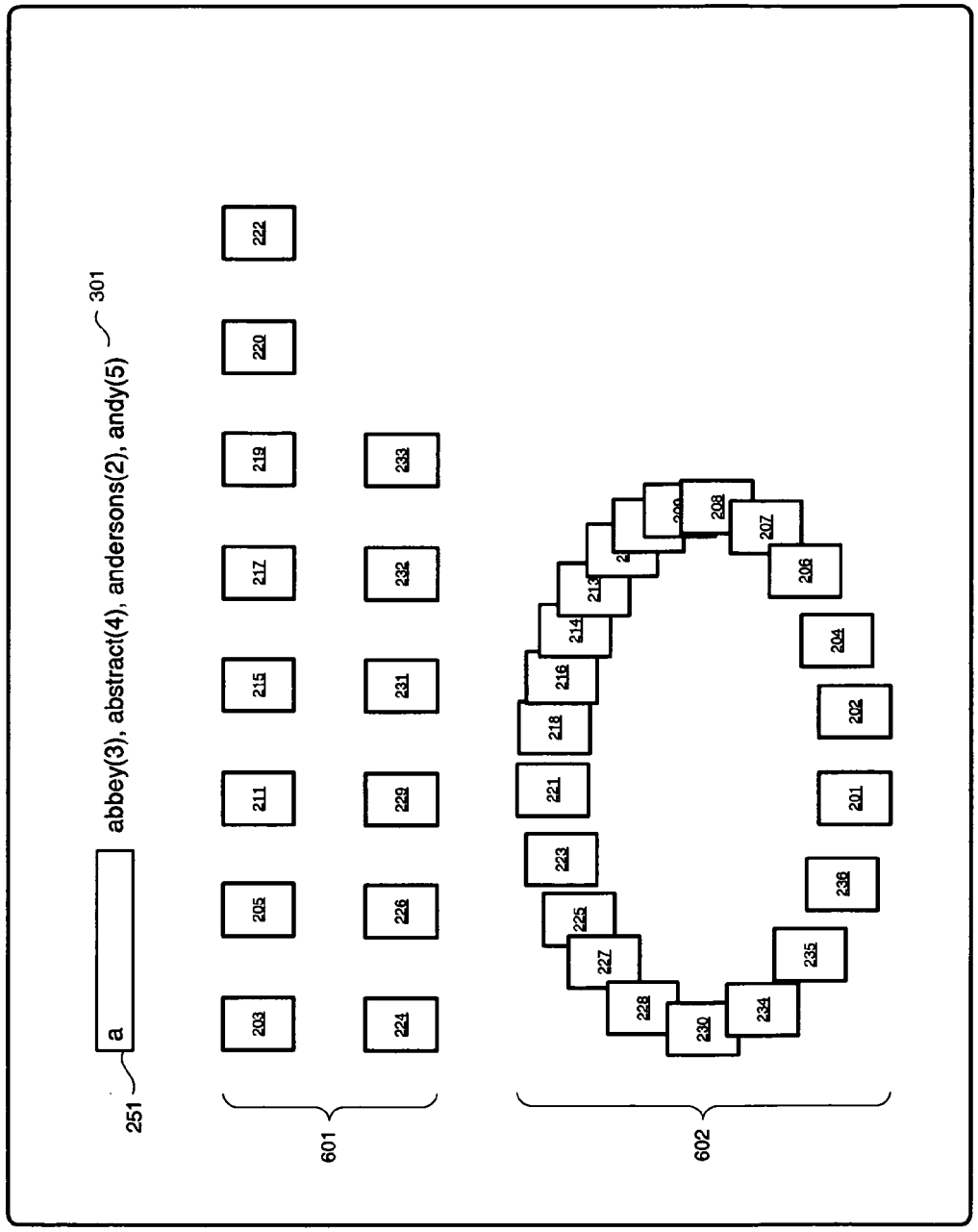
FIG. 6 is a screenshot of an illustrative graphical user interface including a set of item representations filtered so as to be separated between an array and a carousel, in accordance with at least one aspect of the present invention.

Referring to FIG. 6, a second illustrative embodiment of a user interface is shown, where the user has entered the letter "a" in user text entry area 251, and as in the previously described embodiment, computer 100 searches for those of the items that are associated with keywords beginning with the letter "a" or otherwise meeting the criteria of the user input. As in the previous example, the found keywords are "abbey," "abstract," andersons," and "andy," as indicated by element 301 in FIG. 6, corresponding to the item representations in the first chosen subset, i.e., item representations 203, 205, 211, 215, 217, 219, 220, 222, 224, 226, 229, 231, 232, and 233.

It is assumed in this example that, prior to the user typing "a" into text entry area 251, all of item representations 201-236 were arranged in an array such as in FIG. 2. Responsive to the user entering the textual input/criterion "a", computer 100 determines the first chosen subset and moves those of the item representations associated with items that are not part of the first chosen subset downward to form a carousel 602 of those item representations. A carousel is a loop arrangement of item representations. A carousel may or may not rotate, and may be shown in two-dimensional or simulated three-dimensional form. In the present embodiment, some of the item representations in carousel 602 are overlaid by others of the item representations in carousel 602, thereby simulating a three-dimensional loop of the item representations. Carousel 602 rotates as a whole to allow the user to fully see each of the item representations therein, at least temporarily until it slides toward the side or back of the carousel and then back around again. The item representations in the first chosen subset, on the other hand, remain in an array 601 above carousel 602. The reason for this is to provide a way to visually distinguish between those item representations that are part of the first chosen subset and those that are not.

In this example, it is assumed that the user will see the item representations in array 601 as being more relevant than the item representations relegated to carousel 602. Of course, the opposite may occur, where the item representations in the first chosen subset are moved to carousel 602 and the remaining item representations are in array 601. As another possibility, all of item representations 201-236 may start out in a carousel, and then a subset of them may be moved to an array depending upon the user input criterion in text entry area 251.

As in the previously described embodiment, the present illustrative user interface may also be used to further narrow the search criterion, such as by the user appending additional letters to the previously-typed "a". For example, consistent with the examples described herein, the user may append the letter "b" to result in "ab" being entered in the text entry area 251, and in response computer 100 would determine those items and item representations that are part of the second chosen subset and update the user interface as appropriate.

Third Illustrative User Interface

Figure 7:
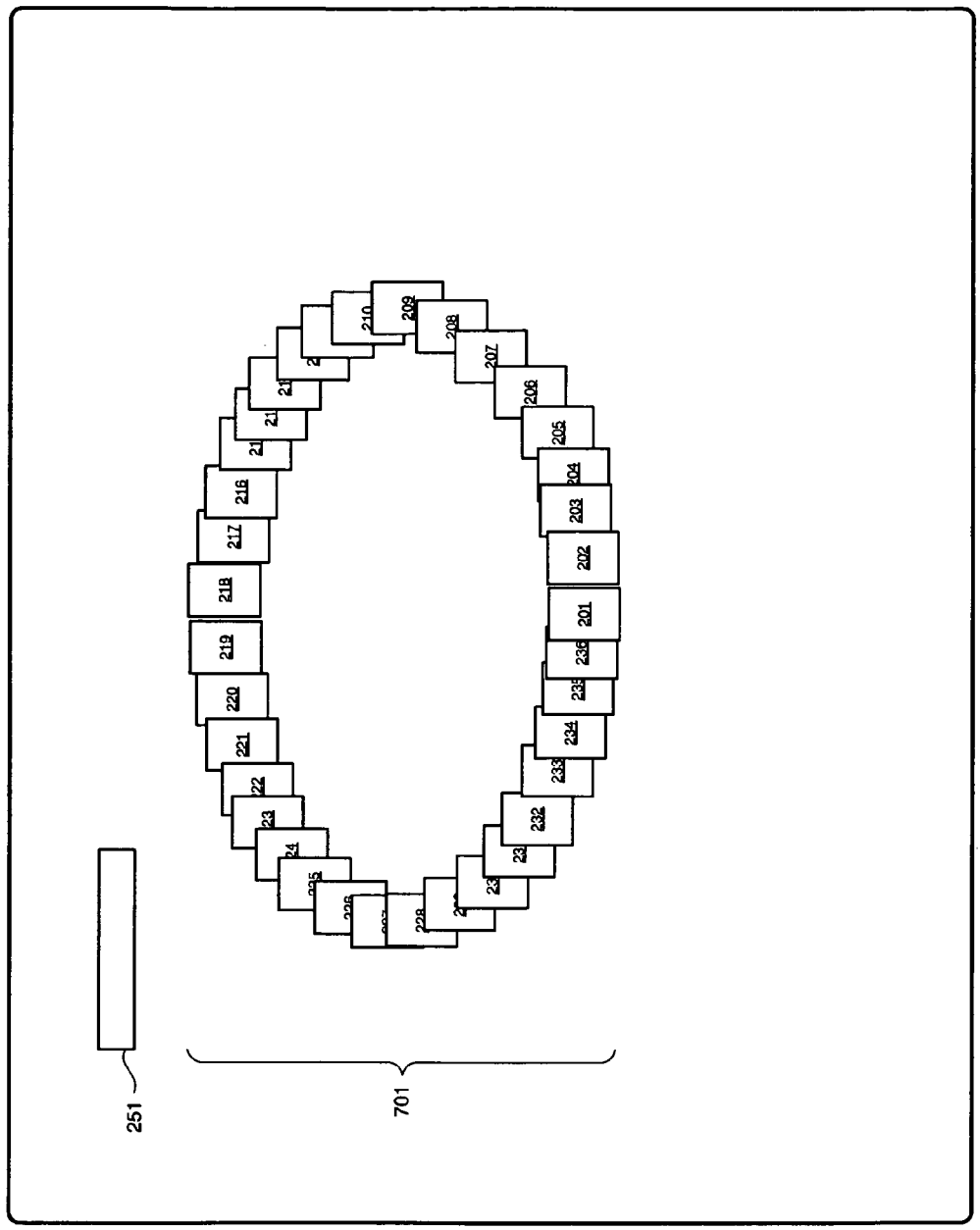
FIG. 7 is a screenshot of an illustrative graphical user interface including a set of item representations in a first carousel, in accordance with at least one aspect of the present invention.
Figure 8:
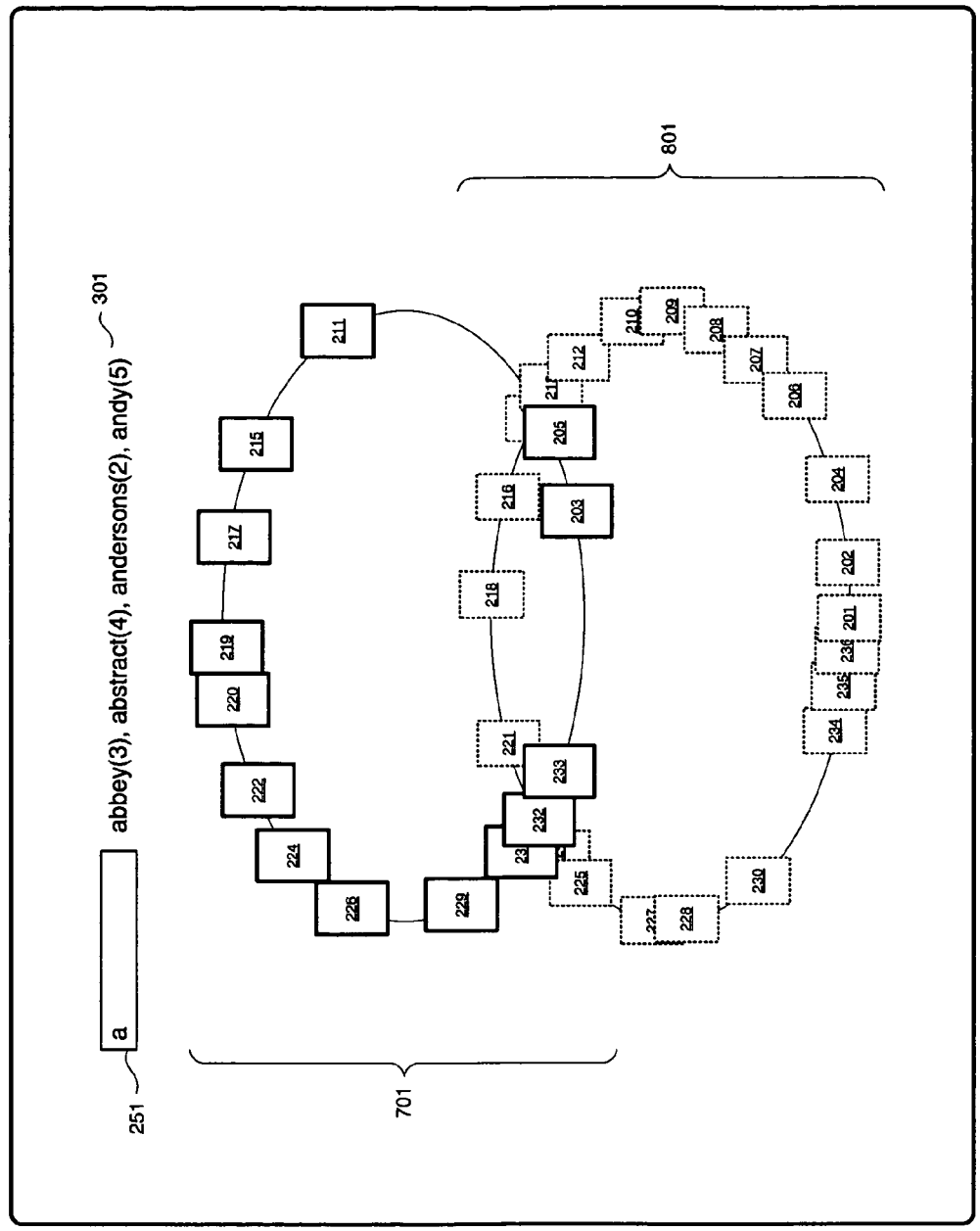
FIG. 8 is a screenshot of the graphical user interface of FIG. 7, wherein the set of item representations filtered so as to be separated between the first carousel and a second carousel, in accordance with at least one aspect of the present invention.

Referring to FIG. 7, a third illustrative embodiment of a user interface is shown, where all of item representations 201-236 start out in a carousel 701, prior to the user entering anything in text input area 251. Carousel 701 may have similar properties as carousel 602 discussed previously. Referring to FIG. 8, the user has now entered the letter "a" in user text entry area 251, and as in the previously described embodiments, computer 100 searches for those of the items that are associated with keywords beginning with the letter "a" or otherwise meeting the criteria of the user input. As in the previous examples, the found keywords are "abbey," "abstract," andersons," and "andy," as indicated by element 301 in FIG. 8, corresponding to the item representations in the first chosen subset, i.e., item representations 203, 205, 211, 215, 217, 219, 220, 222, 224, 226, 229, 231, 232, and 233.

Responsive to the user entering the textual input/criterion "a", computer 100 determines the first chosen subset and moves those of the item representations associated with items that are not part of the first chosen subset downward from first carousel 701 to form a second carousel 801. The item representations in the first chosen subset, on the other hand, remain in first carousel 701. The reason for this is to provide a way to visually distinguish between those item representations that are part of the first chosen subset and those that are not.

In this example, it is assumed that the user will see the item representations in carousel 701 as being more relevant than the item representations relegated to second carousel 801. When item representations are moved from first carousel 701 to second carousel 801, the physical locations of, and interstitial spaces between, each item representation with respect to other item representations within each carousel may be maintained (as is the case in FIG. 8), or alternatively the carousels 701, 801 may shrink to account for the reduced number of item representations in each carousel.

To emphasize the relative importance of each of carousels 701, 801, various display properties may be automatically set as appropriate and desired. For example, first carousel 701 may be larger (e.g., may have a greater total diameter) than second carousel 801, the item representations in carousel 701 may each be larger than the item representations in carousel 801, and/or the item representations in first carousel 701 may be more visible to the user than the item representations in second carousel 801. For example, the item representations in first carousel 701 may be fully opaque while the item representations in second carousel 801 may be partially transparent but still visible. Of course, the opposite may occur, where the item representations in the first chosen subset are moved to second carousel 801 and the remaining item representations remain in first carousel 701.

As in the previously described embodiments, the present illustrative user interface may also be used to further narrow the search criterion, such as by the user appending additional letters to the previously-typed "a". For example, consistent with the examples described herein, the user may append the letter "b" to result in "ab" being entered in the text entry area 251, and in response computer 100 would determine those items and item representations that are part of the second chosen subset and update the user interface as appropriate.

Fourth Illustrative User Interface

Figure 9:
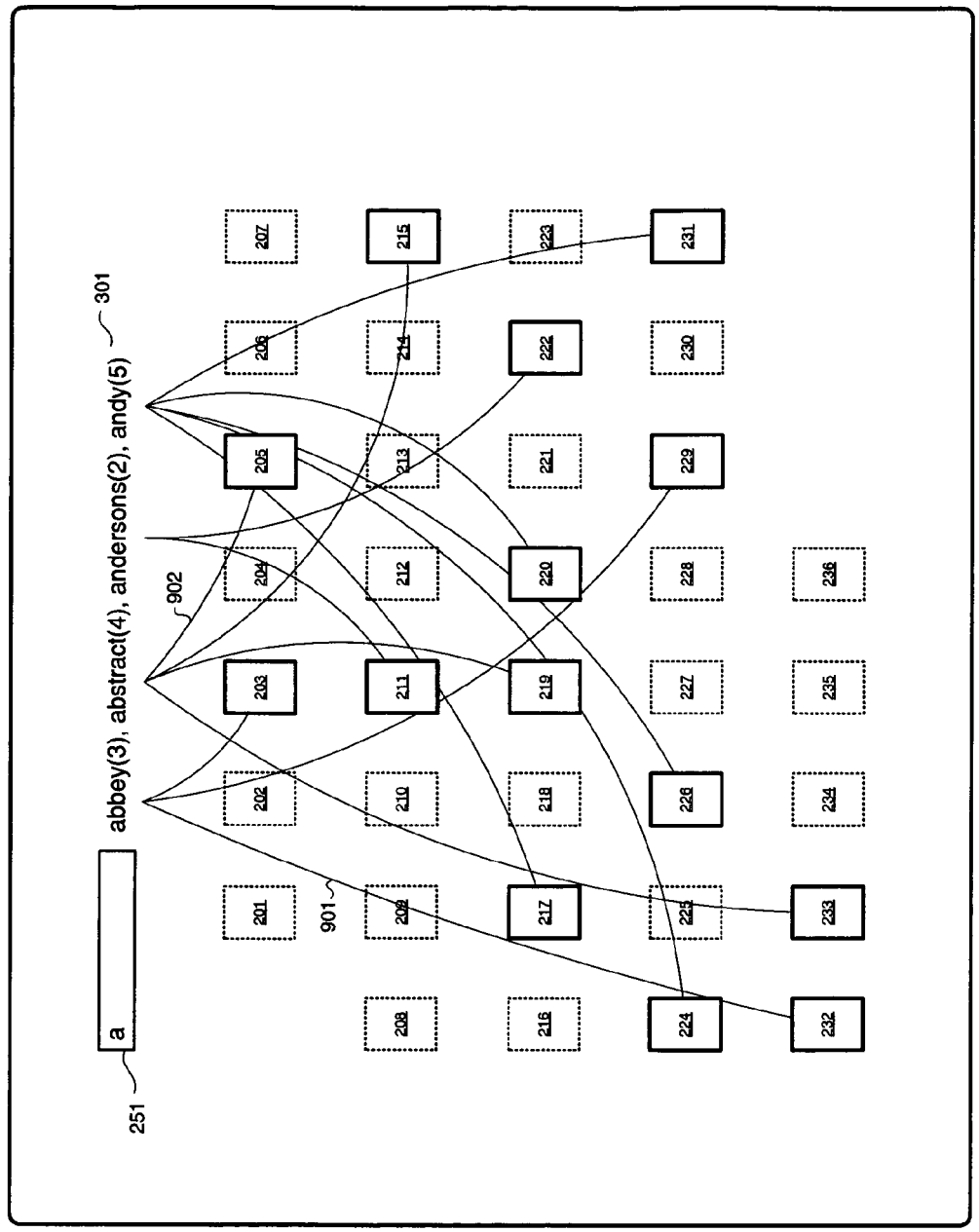
FIG. 9 is a screenshot of an illustrative graphical user interface including an array of filtered item representations, in accordance with at least one aspect of the present invention.

Referring to FIG. 9, a fourth illustrative embodiment of a user interface is shown, where all of item representations 201-236 start out in an array prior to the user entering anything in text input area 251. In this figure, the user has entered the letter "a" in user text entry area 251, and as in the previously described embodiments, computer 100 searches for those of the items that are associated with keywords beginning with the letter "a" or otherwise meeting the criteria of the user input. As in the previous examples, the found keywords are "abbey," "abstract," andersons," and "andy," as indicated by element 301 in FIG. 9, corresponding to the item representations in the first chosen subset, i.e., item representations 203, 205, 211, 215, 217, 219, 220, 222, 224, 226, 229, 231, 232, and 233.

Responsive to determining the first chosen subset, computer 100 in this example maintains the item representations of the first chosen subset as fully opaque, and changes the remaining item representations to be partially transparent yet still visible to the user, as indicated in FIG. 9 by broken lines.

In addition, for each of the displayed keywords in area 301, a connecting line (which may be straight or curved)

may be displayed between the respective displayed keyword and each item representation associated with that displayed keyword. For example, a connecting line 901 is displayed connecting keyword "abbey" and item representation 232, and a connecting line 902 is displayed connecting keyword "abstract" with item representation 205. The connecting lines may be displayed in a layer behind or in front of some or all of item representations 201-236. Of course, the connecting lines, like the other features described herein, may be used in any of the other illustrative embodiments. For example, in FIG. 8, connecting lines may be shown between each item representation in carousel 701 and the displayed keywords. Moreover, each of the displayed keywords in area 301 may be displayed in a different text color, and the connecting lines emanating from each displayed keyword may be displayed in the same color as the respective keyword or in some other color (or having some other display property) that depends on the respective keyword. For example, "abbey" may be displayed as black text, "abstract" may be displayed as red text, "andersons" may be displayed as blue text, and "andy" may be displayed as green text. Likewise, the connecting lines emanating from "abbey" would be black (including connecting line 901), the connecting lines emanating from "abstract" would be red (including connecting line 902), etc. These color-keyed connecting lines may make it much easier for the user to understand which item representations are related to which keywords.

As in the previously described embodiments, the present illustrative user interface may also be used to further narrow the search criterion, such as by the user appending additional letters to the previously-typed "a". For example, consistent with the examples described herein, the user may append the letter "b" to result in "ab" being entered in the text entry area 251, and in response computer 100 would determine those items and item representations that are part of the second chosen subset and update the user interface as appropriate.

Fifth Illustrative User Interface

Figure 10:
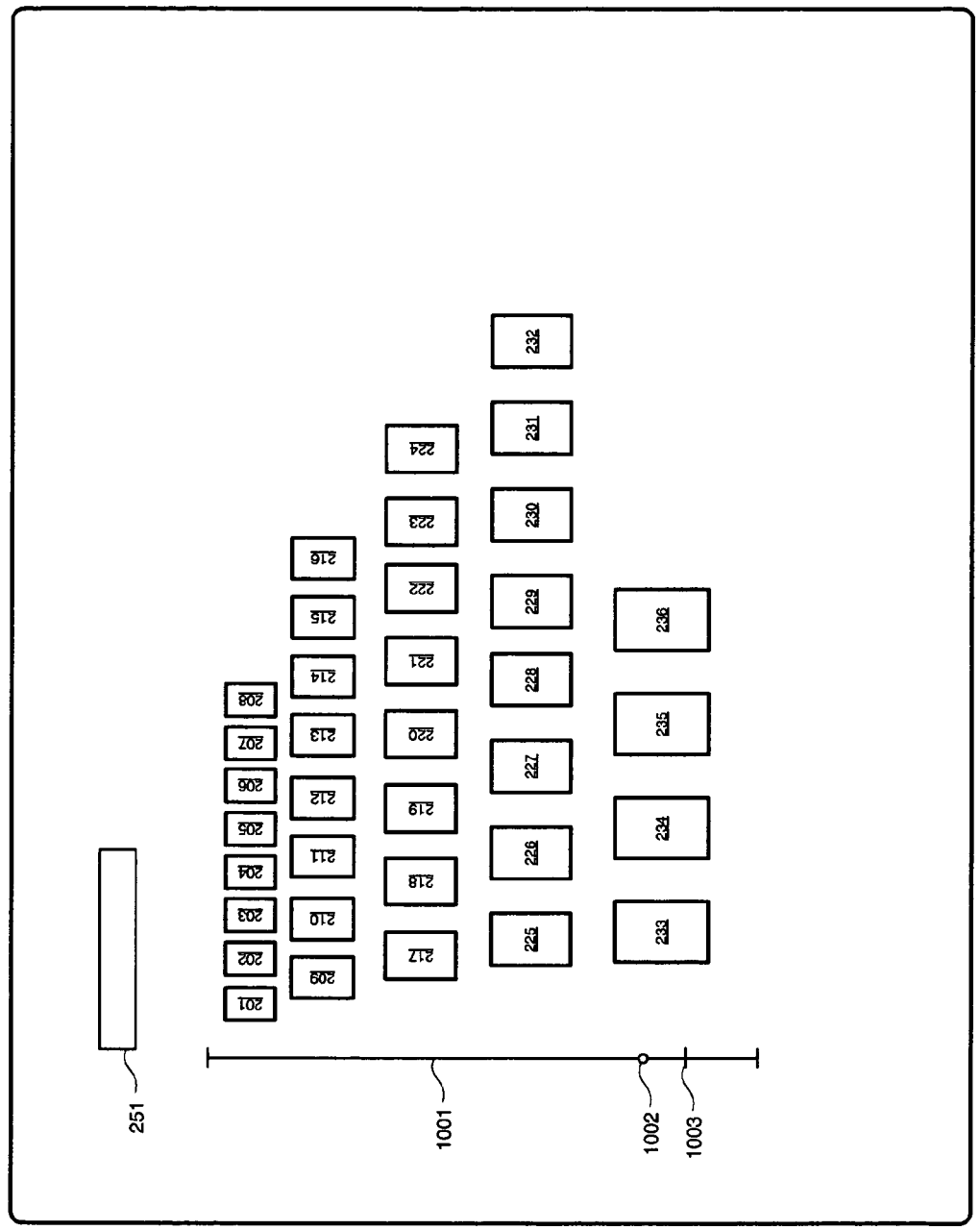
FIG. 10 is a screenshot of an illustrative graphical user interface including a biased array of item representations, in accordance with at least one aspect of the present invention.

Referring to FIG. 10, yet another illustrative embodiment of a user interface is shown, where all of item representations 201-236 start out in an array prior to the user entering anything in text input area 251. In this example, the array is shown such that the rows (and the item representations therein) closer to the bottom are larger than the rows (and the item representations therein) closer to the top, thus giving the illusion of a three-dimensional perspective. This effectively creates a "biased" array, where certain rows or columns are emphasized more than other rows or columns. In this case, the user would naturally understand that item representations in the bottom rows (which are visually "closer" in a three-dimensional perspective) may be more relevant or important than the item representations in the upper rows (which are visually "further" away). As will be seen in the next figure, this bias in the array can be used to some advantage in showing the user the result of filtering through the items.

FIG. 10 also illustrates a control 1001 that allows the user to manually adjust the number of item representations in each row. As shown, there are eight item representations in each row, with the exception of the bottom row because the total number of items in this example is not a multiple of eight. By dragging a handle 1002 up and down on control 1001, the user may increase or decrease the number of item representations per row. Control 1001 may also include an indicator 1003 that indicates to the user where a suggested position of handle 1002 would be. This control 1001 may be used in any array, such as in the array of items in FIGS. 2-5, and may also be used to manually adjust the size (e.g., diameter) of a carousel. Control 1001 is shown as a separate control, however it may be presented in any fashion and may be integrated with other user interface elements. For example, where the array of item representations is displayed in a graphical window, the functionality of control 1001 may be built into the size control handle of the graphical window. In other words, the number of item representations in each row may depend upon the width of the window. Also, where the window is subdivided into panes, the item representations may be displayed in one of the panes and text entry area 251 may be displayed in another one of the panes. Adjustment of the relative sizes of the panes may also cause the number of item representations in each row to be automatically adjusted.

Figure 11:
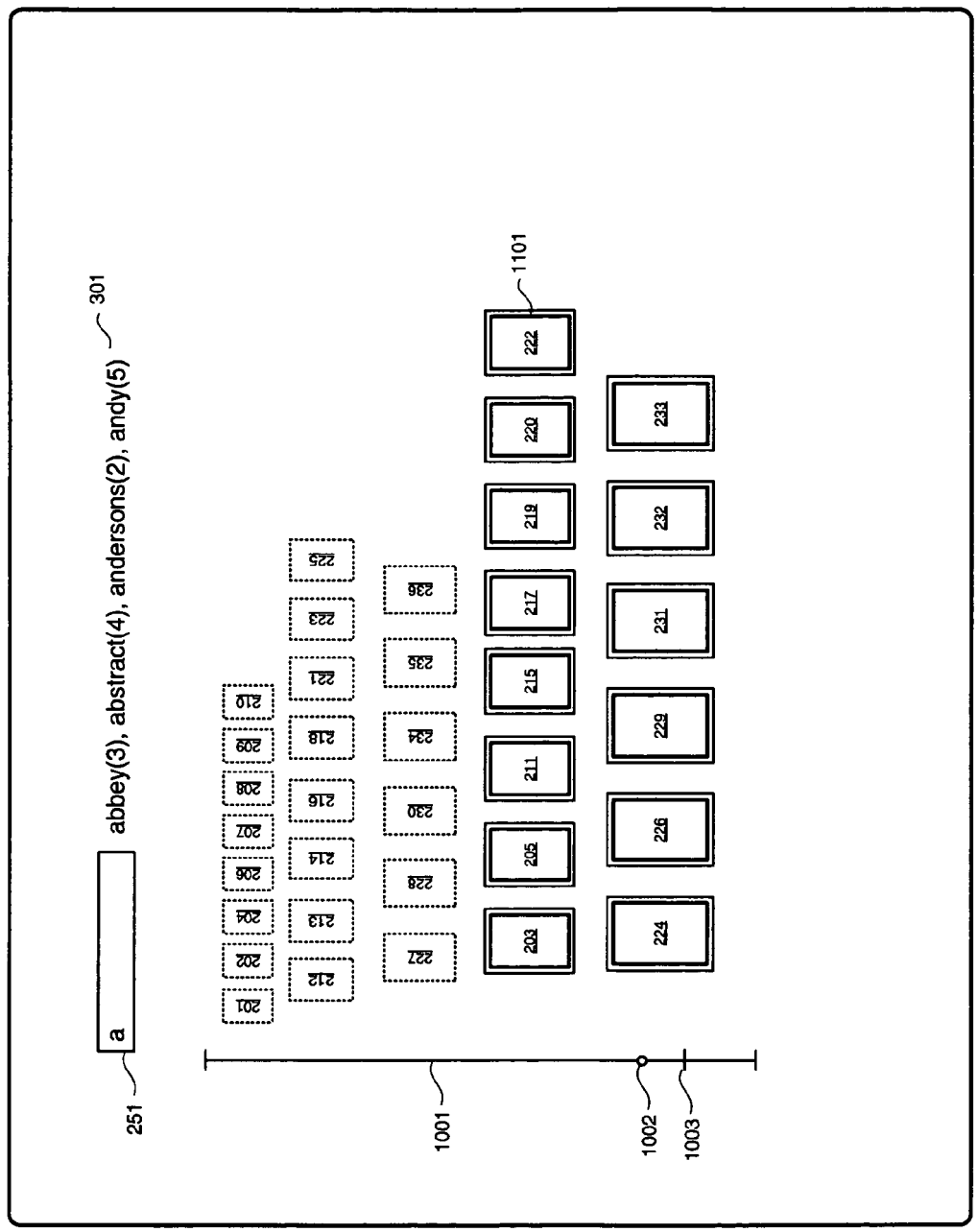
FIG. 11 is a screenshot of the graphical user interface of FIG. 10, wherein the item representations are filtered within the biased array, in accordance with at least one aspect of the present invention.

Referring to FIG. 11, the user has now entered the letter "a" in user text entry area 251, and as in the previously described embodiments, computer 100 searches for those of the items that are associated with keywords beginning with the letter "a" or otherwise meeting the criteria of the user input. As in the previous examples, the found keywords are "abbey," "abstract," andersons," and "andy," as indicated by element 301 in FIG. 9, corresponding to the item representations in the first chosen subset, i.e., item representations 203, 205, 211, 215, 217, 219, 220, 222, 224, 226, 229, 231, 232, and 233.

Responsive to determining the first chosen subset, computer 100 in this example maintains the item representations of the first chosen subset as fully opaque, and changes the remaining item representations to be partially transparent yet still visible to the user, as indicated in FIG. 11 by broken lines.

In addition, the item representations in the first chosen subset are moved to the "front" of the array, which in this example is the bottom portion of the array, and the remaining item representations are relegated to the "back" of the array. This may be advantageous in that it may indicate to the user that the items in the first chosen subset are more relevant than the remaining items. Each of the item representations in the first chosen subset may also be color-coded to one of the keywords displayed in region 301. For example, each of the item representations may have a colored border, such as border 1101 around item representation 222, that depends upon which of the displayed keywords that item representation is associated with. In the present example, border 1101 may be a blue border, and the associated keyword "andersons" may also be displayed as blue text, thus clearly indicating to the user that item representation 222 is associated with the keyword "andersons."

As in the previously described embodiments, the present illustrative user interface may also be used to further narrow the search criterion, such as by the user appending additional letters to the previously-typed "a". For example, consistent with the examples described herein, the user may append the letter "b" to result in "ab" being entered in the text entry area 251, and in response computer 100 would determine those items and item representations that are part of the second chosen subset and update the user interface as appropriate.

Conclusion

Thus, a user interface has been described wherein a set of items is displayed as a set of item representations, and wherein a filtered subset of those items are visually identified in accordance with a user-defined criterion. All of the item representations are displayed on the screen in some form, regardless of which of the items have been filtered out. This may allow the user interface to visually distinguish between those items that have been filtered out and those that are considered relevant.

What is claimed is:

1. A computer-readable medium storing computer-executable instructions for performing steps comprising:
   (a) displaying a plurality of item representations each associated with a different item;
   (b) receiving a user input including a textual criterion;
   (c) determining a subset of the items to be all of the items that satisfy the textual criterion;
   (d) displaying the associated item representations for the subset of items so as to have a first display property;
   (e) displaying the remaining item representations so as to have a second display property different from the first display property, wherein the first display property is a first size profile, and the second display property is a second size profile different from the first size profile; and
   (f) displaying a background behind at least some of the item representations, wherein the background includes the textual criterion.

2. The computer-readable medium of claim 1, wherein the first display property further includes a first intensity profile and the second display property further includes a second intensity profile different from the first intensity profile.

3. The computer-readable medium of claim 1, wherein the first display property further includes a first opacity profile and the second display property further includes a second opacity profile different from the first opacity profile.

4. The computer-readable medium of claim 1, wherein the first display property further includes a property of beings fully opaque and the second display property further includes a property of beings partially transparent.

5. The computer-readable medium of claim 1, wherein the first display property further includes a property of beings a first region of a display and the second display property further includes a property of beings a second region of the display different from the first region of the display.

6. The computer-readable medium of claim 1, wherein the first display property further includes an array arrangement of item representations and the second display property further includes a carousel arrangement of item representations.

7. The computer-readable medium of claim 1, wherein the first display property further includes a first amount of item representation displacement, and the second display property further includes a second amount of item representation displacement.

8. The computer-readable medium of claim 1, wherein each of the items is associated with a keyword, and wherein step (c) includes determining whether the keyword for each item begins with the textual criterion.

9. The computer-readable medium of claim 8, wherein the computer-executable instructions are further for displaying those of the keywords that begin with the textual criterion, wherein each of the displayed keywords are displayed in a different color, and wherein step (d) includes displaying each of the associated item representations for the subset of items to include the color of the displayed keyword that is associated with the respective item.

10. The computer-readable medium of claim 1, wherein the items are each files.

11. A method implemented by a computer, comprising:
    (a) displaying a plurality of item representations each associated with a different item;
    (b) receiving a user input including a textual criterion;
    (c) determining a subset of the items to be all of the items that satisfy the textual criterion;
    (d) displaying the associated item representations for the subset of items so as to have a first display property;
    (e) displaying the remaining item representations so as to have a second display property different from the first display property;
    (f) displaying a plurality of textual terms based on the textual criterion and associated with the subset of items, and for each of the textual terms, displaying a numerical indication of how many items of the subset are associated with the respective textual term; and
    (g) displaying a background behind at least some of the item representations, wherein the background includes the textual criterion.

12. The method of claim 11, wherein the first display property is a first intensity profile and the second display property is a second intensity profile different from the first intensity profile.

13. The method of claim 11, wherein the first display property is a first opacity profile and the second display property is a second opacity profile different from the first opacity profile.

14. The method of claim 11, wherein the first display property is fully opaque and the second display property is partially transparent.

15. The method of claim 11, wherein the first display property is an array arrangement of item representations and the second display property is a carousel arrangement of item representations.

16. The method of claim 11, wherein the first display property is a first amount of item representation displacement, and the second display property is a second amount of item representation displacement.

17. The method of claim 11, wherein each of the items is associated with a keyword, and wherein step (c) includes determining whether the keyword for each item begins with the textual criterion.

* * * * *

UNITED STATES PATENT AND TRADEMARK OFFICE
CERTIFICATE OF CORRECTION

| | | |
|---|---|---|
| PATENT NO. | : 7,383,503 B2 | Page 1 of 1 |
| APPLICATION NO. | : 11/063885 | |
| DATED | : June 3, 2008 | |
| INVENTOR(S) | : Richard Banks | |

It is certified that error appears in the above-identified patent and that said Letters Patent is hereby corrected as shown below:

In column 13, line 33, in Claim 4, delete "beings" and insert -- being --, therefor.

In column 13, line 35, in Claim 4, delete "beings" and insert -- being --, therefor.

In column 13, line 37, in Claim 5, delete "a property of beings" and insert -- displaying in --, therefor.

In column 13, line 39, in Claim 5, delete "a property of beings" and insert -- displaying in --, therefor.

Signed and Sealed this
Nineteenth Day of April, 2011

David J. Kappos
*Director of the United States Patent and Trademark Office*